United States Patent
Miura et al.

(10) Patent No.: US 6,903,312 B2
(45) Date of Patent: Jun. 7, 2005

(54) APPARATUS FOR TEMPERATURE CONTROLLING GRIP HEATER

(75) Inventors: Ryoichi Miura, Niiza (JP); Masaki Kakuta, Iruma (JP); Tokuzo Tojo, Tokorozawa (JP)

(73) Assignees: Kabushiki Kaisha Honda Access, Niiza (JP); Shindengen Electric Manufacturing Company Limited, Hanno (JP)

(*) Notice: Subject to any disclaimer, the term of this patent is extended or adjusted under 35 U.S.C. 154(b) by 2 days.

(21) Appl. No.: 10/457,607

(22) Filed: Jun. 10, 2003

(65) Prior Publication Data

US 2003/0226836 A1 Dec. 11, 2003

(30) Foreign Application Priority Data

| Jun. 10, 2002 | (JP) | 2002-169341 |
| Jun. 10, 2002 | (JP) | 2002-169344 |
| Jun. 10, 2002 | (JP) | 2002-169346 |
| Aug. 29, 2002 | (JP) | 2002-251689 |

(51) Int. Cl.⁷ ............................................. H05B 1/02
(52) U.S. Cl. ............... 219/506; 219/202; 219/497; 219/508; 74/551.9
(58) Field of Search .................. 219/204, 202, 219/497, 505, 499, 501, 506, 508; 74/551.9, 558.5, 557

(56) References Cited

U.S. PATENT DOCUMENTS

| 744,739 A | 11/1903 | Fliess | |
| 3,667,315 A | 6/1972 | Polly, Sr. | |
| 4,234,784 A | * 11/1980 | Totterdell | 219/506 |
| 5,504,306 A | * 4/1996 | Russell et al. | 219/497 |
| 5,757,165 A | 5/1998 | Minks | |
| 5,802,957 A | * 9/1998 | Wanat et al. | 99/327 |
| 6,114,668 A | * 9/2000 | Ogata et al. | 219/494 |
| 6,198,080 B1 | * 3/2001 | Rice et al. | 219/506 |

FOREIGN PATENT DOCUMENTS

| DE | 100 48 181 A1 | 4/2002 |
| EP | 0 857 643 A1 | 8/1998 |
| JP | 57 191170 A | 11/1982 |
| JP | 01 090885 A | 4/1989 |
| JP | 10-79284 | 3/1998 |
| JP | 3231247 | 9/2001 |

* cited by examiner

*Primary Examiner*—Mark Paschall
(74) *Attorney, Agent, or Firm*—Westerman, Hattori, Daniels & Adrian, LLP

(57) ABSTRACT

A grip heater control apparatus has a heater provided in a left grip of a steering handle of a motorcycle or the like, a heater control unit mounted on a left cowling of the motorcycle, a cover disposed on an upper end of a heater control unit and supporting thereon a plurality of LEDs and up and down switches, a controller disposed in the heater control unit for controlling the amount of electricity supplied from a battery, and a branch cable interconnecting the controller and the heater. The temperature of the heater is adjusted by the number of times that buttons of the up and down switches are pressed.

15 Claims, 27 Drawing Sheets

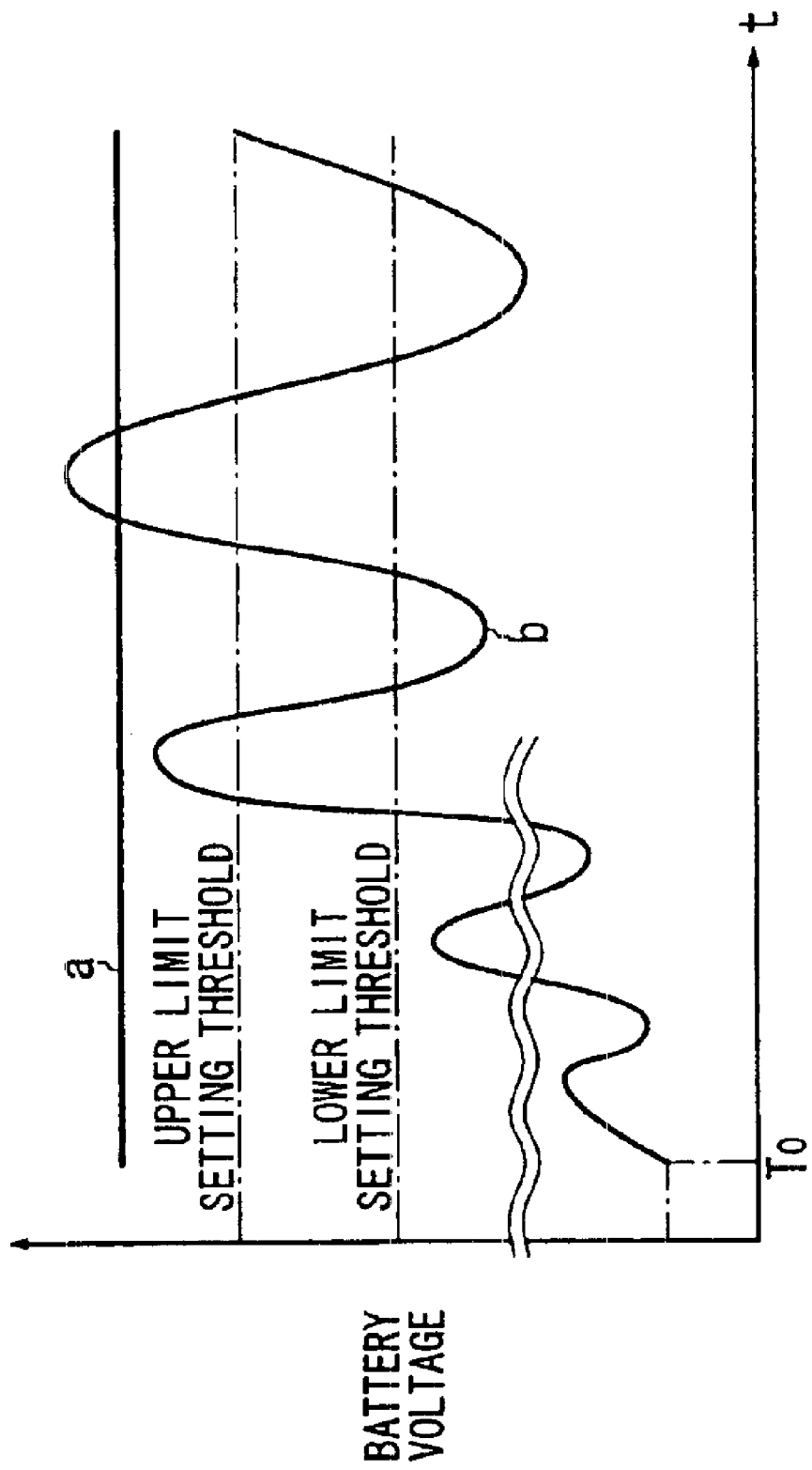

APPARATUS FOR TEMPERATURE CONTROLLING GRIP HEATER

BACKGROUND OF THE INVENTION

1. Field of the Invention

The present invention relates to a grip heater control apparatus, and more particularly to a grip heater control apparatus for controlling a grip heater incorporated in a steering handle of a motorcycle, a snowmobile, a personal water craft, a three-wheeled buggy, or the like.

2. Description of the Related Art

Heretofore, there has been employed a grip heater control apparatus for controlling electricity supplied from a battery to a heater which is provided in a handle grip (also called a steering grip, hereinafter referred to as "grip") of a steering handle of a motorcycle, a snowmobile, a personal water craft, a three-wheeled buggy, or the like, thereby to heat and keep the grip at a suitable temperature to provide a comfortable driving environment for the driver to drive the vehicle in winter or cold climate.

The grip heater control apparatus generally comprises a Nichrome wire or a film-like board, which functions as a heater, wound circumferentially in the grip that is made of rubber or the like, a cylindrical potentiometer having a function as a switch and a function to adjust the temperature of the heater, a controller integrally combined with the potentiometer for controlling electricity supplied to the heater, and a wiring that interconnects the heater and the controller. The potentiometer and the controller are fixed integrally together in a position near the grip by a stay or the like.

When the potentiometer is turned clockwise from its initial position, the grip heater control apparatus is energized to supply an amount of electricity depending on the angular displacement of the potentiometer from the battery through the controller and a lead to the Nichrome wire. When the potentiometer is turned further clockwise, the amount of electricity supplied from the battery to the Nichrome wire is controlled in proportion to the angular displacement of the potentiometer. The supplied electricity causes the Nichrome wire in the grip to generate heat, heating the grip to a certain temperature. The temperature of the grip can freely be adjusted through the heater by turning the potentiometer.

Conventional grip heater control apparatus are disclosed in Japanese laid-open patent publication No. 10-79284 and Japanese patent No. 3231247, for example.

In the grip heater control apparatus disclosed in the above publications, in order to adjust the electricity supplied to the heater by operating the potentiometer that is integrally coupled to a power supply switch, the output voltage from the potentiometer is compared as a comparison voltage with a predetermined periodic voltage wave, e.g., a triangular voltage wave in level to produce a PWM output signal. The PWM output signal is applied to turn on and off a switching circuit to control the electricity supplied from the battery to the heater for thereby heating the heater.

The grip heater control process is ancillary to the vehicle and when the voltage of the battery drops below a minimum voltage required to energize the starter motor of the vehicle, the supply of the electricity from the battery to the heater needs to be stopped in order to give priority to the propulsion of the vehicle. The vehicle has a battery voltage monitoring circuit for forcibly turning off the switching circuit regardless of the value of the comparison voltage if the battery voltage which is detected becomes close to the minimum voltage required to energize the starter motor. The vehicle also has a failsafe circuit for forcibly turning off the switching circuit if the comparison voltage is not determined.

The battery voltage monitoring circuit controls the switching circuit to inhibit energization of the heater if a voltage value based on the battery voltage supplied to the battery voltage monitoring circuit is lower than a first voltage threshold VS1, and controls the switching circuit to allow energization of the heater if the voltage value based on the battery voltage supplied to the battery voltage monitoring circuit is higher than a second voltage threshold VS2 (VS2>VS1).

If the minimum voltage value required by the battery is represented by $V_N$, a voltage drop caused by the resistance of the wiring between the battery and the battery voltage monitoring circuit is represented by $\Delta v1$, and a maximum detected error voltage expected by the battery voltage monitoring circuit is represented by $\Delta v2$, then the first voltage threshold VS1 is set to $VS1=V_N-\Delta v1+\Delta v2$, providing a hysteresis based on the first voltage threshold VS1 and the second voltage threshold VS2. When the battery voltage drops below the first voltage threshold VS1, the switching circuit is controlled to inhibit energization of the heater, and when the battery voltage rises to or beyond the second voltage threshold VS2, the switching circuit is controlled to allow energization of the heater. Thus, the switching circuit is prevented from repeatedly inhibiting and allowing energization of the heater frequently, and the minimum battery voltage is maintained. The conventional grip heater control apparatus has various drawbacks which will be described below.

The potentiometer for adjusting the temperature of the heater is expensive. Since the potentiometer has mechanically movable components such as a movable contact, the durability of the potentiometer is lowered by usage over a long period of time due to a mechanically sliding action of the potentiometer which is repeated each time the heater temperature is adjusted.

The potentiometer for instructing the controller to adjust the electricity supplied to the heater does not provide tactile clicks, and hence prevents the driver from easily recognizing adjustment instructions that the driver has made.

When the battery voltage is initially applied as when the engine of the vehicle is started, the battery voltage is unstable because of strong voltage variations of the alternator, causing light-emitting diodes (LEDs) to emit repeated flickering light that tends to make the driver feel uneasy.

When noise is added to the detected battery voltage, no accurate battery voltage can be obtained. Consequently, it is necessary to set a minimum required battery voltage with a margin in view of possibly added noise. As a result, the battery voltage cannot effectively be utilized.

SUMMARY OF THE INVENTION

It is therefore an object of the present invention to provide a grip heater control apparatus which makes it possible to adjust the temperature of a heater without the need for a potentiometer, and hence is a low cost and is highly durable.

Another object of the present invention is to provide a grip heater control apparatus which gives the operator a tactile feedback in response to an action to instruct a heater control unit to adjust electricity supplied to a heater, and allows the operator to visually recognize adjustment instructions with ease.

Still another object of the present invention is to provide a grip heater control apparatus which is capable of preventing the operator from feeling uneasy due to the flickering of LEDs at the time the battery voltage is unstable immediately after the battery voltage is initially applied.

Yet another object of the present invention is to provide a grip heater control apparatus which is not required to set a minimum required battery voltage with a margin in view of noise.

To achieve the above objects, there is provided a grip heater control apparatus comprising a heater control unit for controlling the supply of electricity from a battery to a grip heater in a steering handle, the heater control unit comprising an up switch and a down switch, and a plurality of LEDs. The number of energized LEDs is increased based on the number of times the up switch (SW1) is turned on, and the number of energized LEDs is decreased based on the number of times the down switch (SW2) is turned on.

With the above arrangement, since the number of energized LEDs can be increased or decreased based on the number of times the up switch and the down switch are turned on, the supply of electricity from the battery to the grip heater through the heater control unit can be controlled depending on the increased or decreased number of energized LEDs. Therefore, the temperature of the grip heater can be controlled without the need for a potentiometer. As no potentiometer is used, the grip heater control apparatus is a low cost and has increased durability and service life.

The heater control unit further comprises switching means for selectively energizing the grip heater with the battery to control the supply of electricity from the battery to the grip heater, number-of-energized-LED control means for controlling the number of energized LEDs based on the number of times the up switch is turned on, and controlling the number of de-energized LEDs based on the number of times the down switch is turned on, thereby to control the number of energized LEDs, and energization control means for controlling the switching means at an energization ratio determined by the number-of-energized-LED control means.

Based on the number of times the up switch is turned on and the number of times the down switch is turned on, the number of energized LEDs is determined under the control of the number-of-energized-LED control means. The up and down switches give the operator a tactile feedback in response to an action to turn on these switches, and the number of energized LEDs allows the operator to visually recognize energization adjustment instructions produced by the up and down switches. Since the energization ratio for the grip heater corresponds to the number of energized LEDs, the operator can easily predict the controlled temperature of the heater. If the LEDs are arranged in a linear array, the operator finds it easy to visually recognize the number of energized LEDs.

The heater control unit further comprises LED energization control means. The energization control means comprises means for turning on and off the switching circuit at the energization ratio determined by the number-of-energized-LED control means for a period of time after the battery voltage of the battery has reached an upper limit setting threshold that is equal to the sum of a lower limit setting threshold, at which the grip heater is inhibited from being energized, and a predetermined voltage, until the battery voltage next reaches the lower limit setting threshold. The LED energization control means comprises means for energizing a number of LEDs for a predetermined period of time after the battery voltage has initially reached the upper limit setting threshold from the application of the battery voltage, and energizing a number of LEDs determined by the number-of-energized-LED control means for a period of time after the battery voltage has reached the upper limit setting threshold until the battery voltage next reaches the lower limit setting threshold, after elapse of the predetermined period of time.

The heater control unit further comprises switching means for selectively energizing the grip heater with the battery to control the supply of electricity from the battery to the grip heater, average corrected battery voltage calculating means for averaging corrected battery voltages, each produced by adding a voltage drop caused by a wire connected between the grip heater and the battery to the battery voltage which is detected each time the battery voltage is detected, to determine an average corrected battery voltage, energization/de-energization control means for controlling the switching circuit to inhibit the heater from being energized for a period of time until the average corrected battery voltage next reaches an upper limit setting threshold that is equal to the sum of a lower limit setting threshold, at which the grip heater is inhibited from being energized, and a predetermined voltage, from below the lower limit setting threshold, and controlling the switching circuit to allow the grip heater to be energized for a period of time after the average corrected battery voltage has reached the upper limit setting threshold until the average corrected battery voltage next reaches the lower limit setting threshold.

According to the present invention, there is also provided a grip heater control apparatus comprising switching means for selectively energizing a grip heater in a steering handle with a battery, average corrected battery voltage calculating means for averaging corrected battery voltages, each produced by adding a voltage drop caused by a wire connected between the grip heater and the battery to the battery voltage which is detected each time the battery voltage is detected, to determine an average corrected battery voltage, and energization/de-energization control means for controlling the switching circuit to inhibit the heater from being energized for a period of time until the average corrected battery voltage next reaches an upper limit setting threshold that is equal to the sum of a lower limit setting threshold, at which the grip heater is inhibited from being energized, and a predetermined voltage, from below the lower limit setting threshold, and controlling the switching circuit to allow the grip heater to be energized for a period of time after the average corrected battery voltage has reached the upper limit setting threshold until the average corrected battery voltage next reaches the lower limit setting threshold.

With the above arrangement, an average value of corrected battery voltages, each produced by adding a voltage drop caused by a wire connected between the grip heater and the battery to the battery voltage which is detected each time the battery voltage is detected, is determined as an average corrected battery voltage. Therefore, even if the detected battery voltage suffers noise, the effect of the noise is also averaged and smoothed, thus reducing the effect of the noise on the detected battery voltage. As a consequence, there is no need to provide a margin in setting the lower limit setting threshold.

For a period until the average corrected battery voltage next reaches the upper limit setting threshold from below the lower limit setting threshold, the switching means is inhibited from energizing the heater, and hence the heater is inhibited from being energized by the switching means. Therefore, the required voltage of the battery is maintained.

For a period until the average corrected battery voltage next reaches the lower limit setting threshold after having reached the upper limit setting threshold, the switching means is allowed to energize the heater, and hence the heater can be turned on and off by the switching means. The temperature of the heater can thus be increased as the heater is turned on and off by the switching means. In a period in which the average corrected battery voltage increases from below the lower limit setting threshold, since the switching means is not allowed to energize the heater, the battery voltage does not suffer a reduction which would otherwise result from the energization of the heater.

The up switch comprises a first button switch and the down switch comprises a second button switch, and the heater control unit further comprises a controller, a casing housing the controller therein, a cover connected to an upper portion of the casing and supporting on an upper surface thereof the first button switch, the second button switch, and the LEDs, and a connector mounted on a side of the casing which lies substantially perpendicularly to the upper surface of the cover, for allowing a cable connected to the controller to extend out of the casing, the controller being surrounded by the casing and the cover.

With the above arrangement, the button switches can easily be operated as they are simply pressed, and the controller is prevented from being exposed to water dust, etc. Because a potentiometer which is structurally complex and has no sliding parts is not used, the grip heater control apparatus is a low cost and has prolonged durability and service life.

The connector has an insertion sleeve in which the cable connected to the controller is inserted, and grooves defined in respective opposite sides thereof which extend substantially perpendicularly to an axial direction of the insertion sleeve, the grooves extending from the cover to the casing, the side of the casing engaging in the grooves. The connector can thus be installed simply and reliably.

The cover has engaging teeth projecting from inner wall surfaces thereof, the engaging teeth being locked in respective engaging holes defined in the casing in alignment with the engaging teeth when the cover is mounted on the upper portion of the casing. The casing and the cover can thus be coupled to each other simply and reliably.

The heater control unit is inserted in an installation hole defined in a body cowling of a motorcycle, the body cowling being held between teeth on the cover and the cover. Therefore, the heater control unit can simply be installed on the body cowling.

The controller is fixed in position by a thermosetting resin material filled in the casing. When the thermosetting resin material filled in the casing is solidified, the controller is firmly fixed in position in the casing, and protected from water, dust, etc.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 27 is a diagram showing how the battery voltage changes immediately after the grip heater control apparatus starts to operate.

DESCRIPTION OF THE PREFERRED EMBODIMENTS

The grip heater control apparatus according to the present invention will be explained in detail below with reference to the accompanying drawings as exemplified by preferred embodiments.

Figure 1:
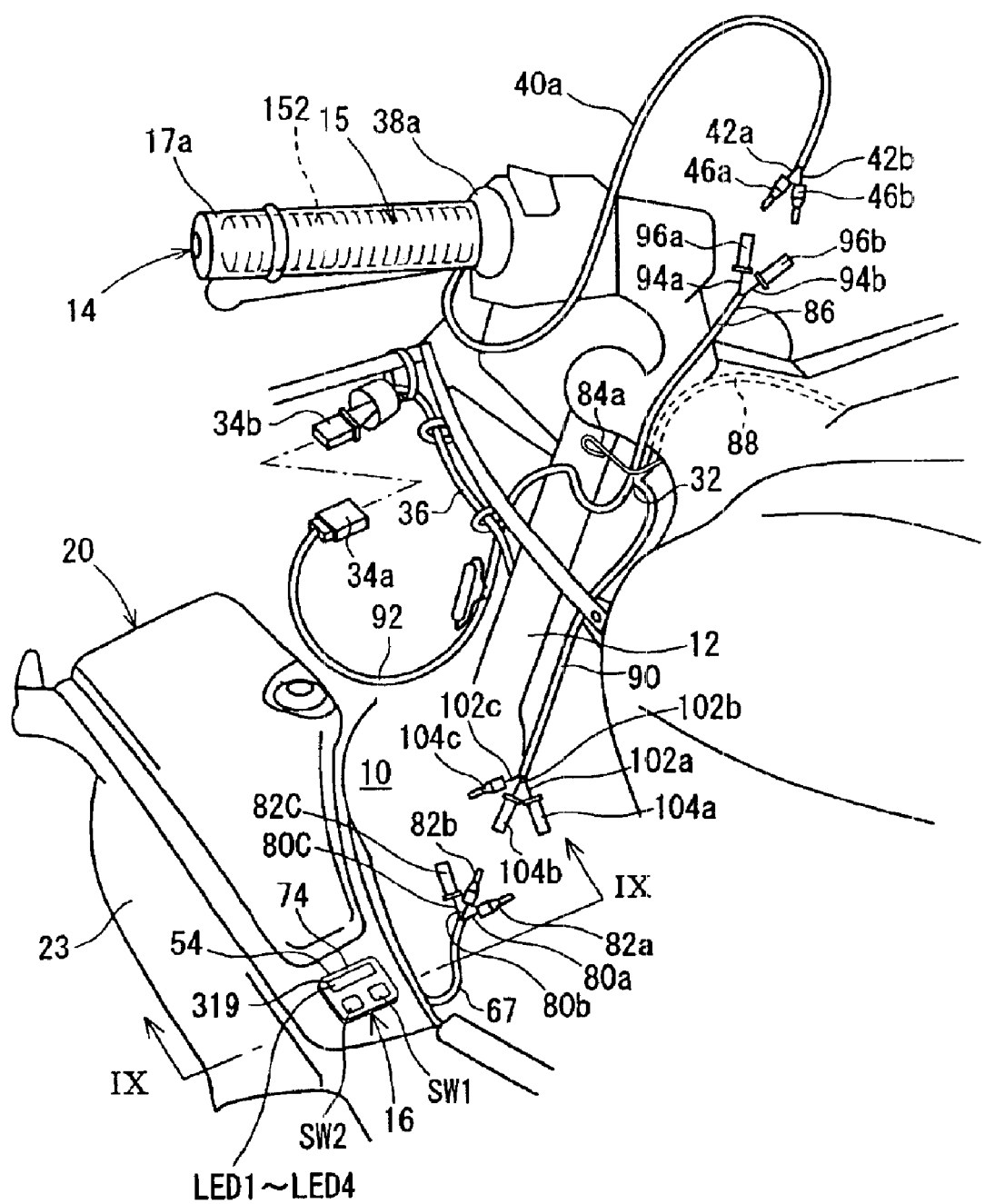
FIG. 1 is a perspective view of a front left portion of a motorcycle on which a grip heater control apparatus according to an embodiment of the present invention is mounted.

FIG. 1 shows in perspective a grip heater control apparatus 10 according to an embodiment of the present invention, which is mounted on a front left portion of a motorcycle.

Figure 2:
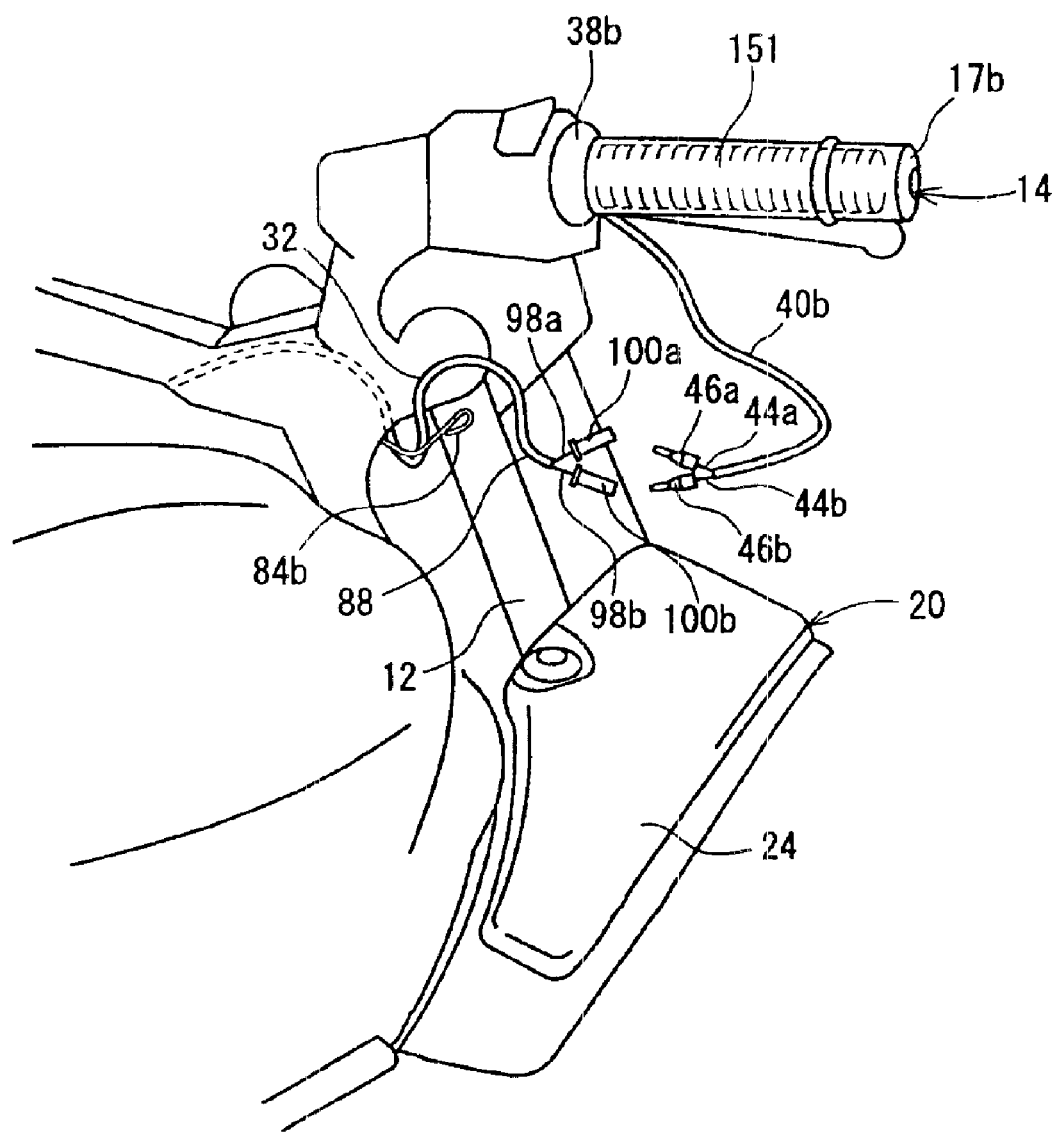
FIG. 2 is a perspective view of a front right portion of the motorcycle on which the grip heater control apparatus is mounted.

As shown in FIG. 1, the motorcycle has a pair of front fork members 12 (see also FIG. 2) mounted on a front end of a motorcycle frame, with a front wheel (not shown) being rotatably supported on the front fork members 12. Cylindrical steering handles 14 (see also FIG. 2) for steering the front wheel are mounted on upper ends of the front fork members 12 by a steering column and extend horizontally in opposite directions. A left grip 17a made of rubber or the like is mounted on the left end of the steering handle 14. As shown in FIG. 2, a right grip 17b made of rubber or the like is mounted on the right end of the steering handle 14. The right grip 17b functions as a throttle grip.

As shown in FIG. 1, a cowling 20 made of a synthetic resin material is integrally mounted on the vehicle frame for reducing air resistance that is applied when the motorcycle is in motion. The cowling 20 comprises a left cowling 23 on the left side of the vehicle frame and a right cowling 24 (see FIG. 2) on the right side of the vehicle frame.

As shown in FIG. 1, the grip heater control apparatus comprises a heater (also referred to as a grip heater) 15 (heaters 151, 152 (see FIG. 2)) in the form of a thin flexible printed-wiring board or the like incorporated in each of the left grip 17a and the right grip 17b (see FIG. 2), a heater control unit (also referred to as a switch unit) 16 for displaying temperature settings for the heaters 151, 152 and setting temperatures of the heaters 151, 152, a controller 30 (see FIG. 5) disposed in the heater control unit 16 for controlling electricity supplied to the heaters 151, 152, a tetrafurcated branch cable 32 interconnecting the heaters 151, 152 and the controller 30, and a wire 36 having an end connected to a connector 34a of the branch cable 32 and an opposite end connected to a battery 311 (described later on).

Figure 10:
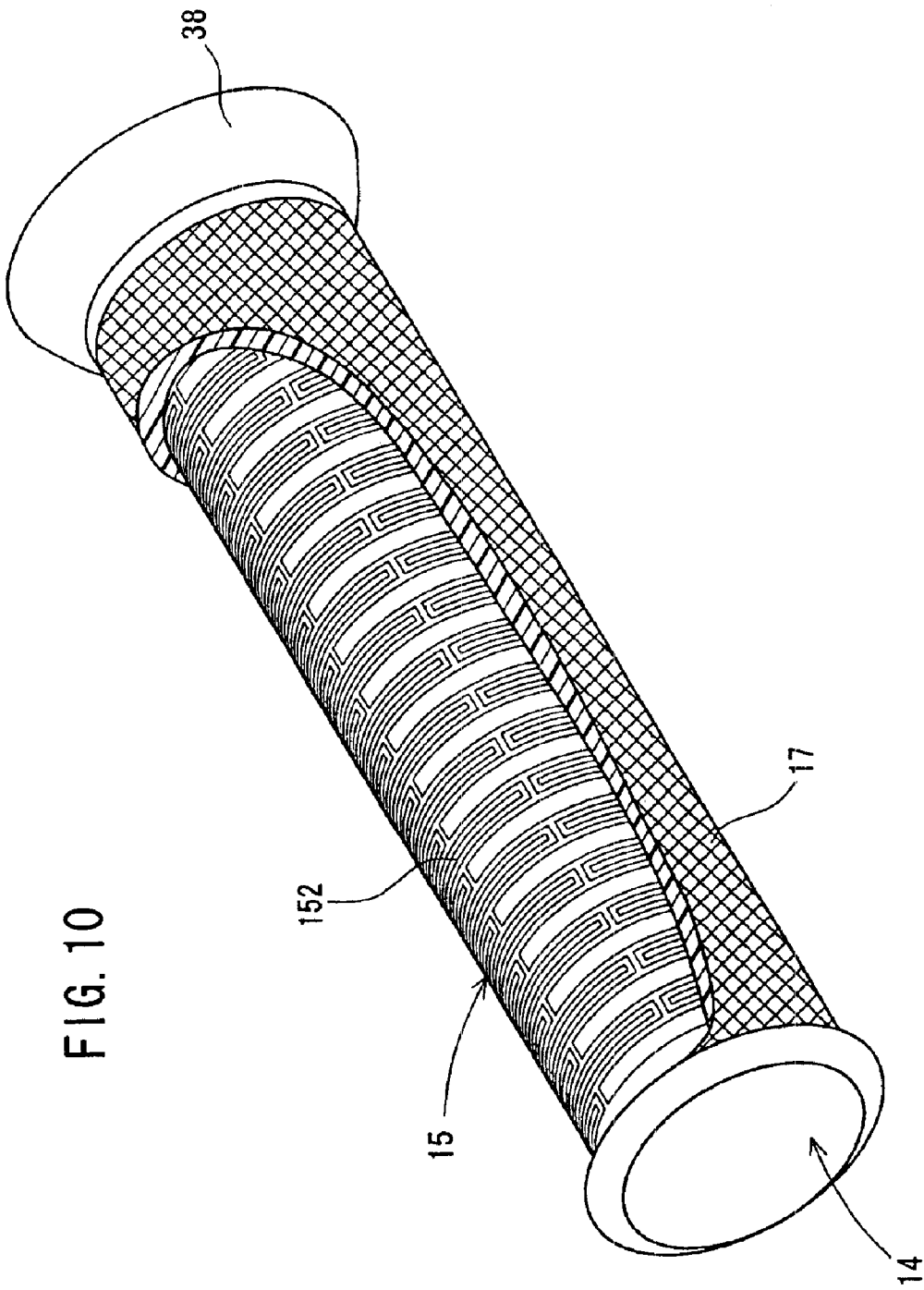
FIG. 10 is a perspective view, partly cut away, of a left grip incorporating the grip heater control apparatus.

The heaters 151, 152 (see also FIG. 10) are flexible and wound fully around the respective opposite ends of the steering handle 14. The left and right grips 17a, 17b which are made of rubber cover the respective heaters 151, 152. The heaters 151, 152 are not limited to being mounted in the respective left and right grips 17a, 17b, but may be wound around the respective left and right grips 17a, 17b.

Annular flanges 38a, 38b (see also FIG. 2) are disposed on respective ends of the left and right grips 17a, 17b which are closer to the center of the motorcycle. The annular flanges 38a, 38b are larger in diameter than the left and right grips 17a, 17b. Heater cables 40a, 40b (see also FIG. 2) extend respectively from the flanges 38a, 38b. The heater cables 40a, 40b comprise two first heater harnesses 42a, 42b and two second heater harnesses 44a, 44b (see also FIG. 2) which extend in the respective flanges 38 (38a, 38b) and are connected to the heaters 151, 152, respectively. Connection terminals 46a, 46b made of metal are mounted on the respective tip ends of the first heater harnesses 42a, 42b and connected respectively to connection terminals 96a, 96b, to be described later on, on the branch cable 32. As shown in FIG. 2, connection terminals 46a, 46b made of metal are also mounted on the respective tip ends of the second heater harnesses 44a, 44b and connected respectively to connection terminals 100a, 100b, to be described later on, on the branch cable 32.

As shown in FIG. 1, the heater control unit 16 is embedded in the left cowling 23, and has an upper portion slightly raised from the surface of the left cowling 23.

Figure 3:
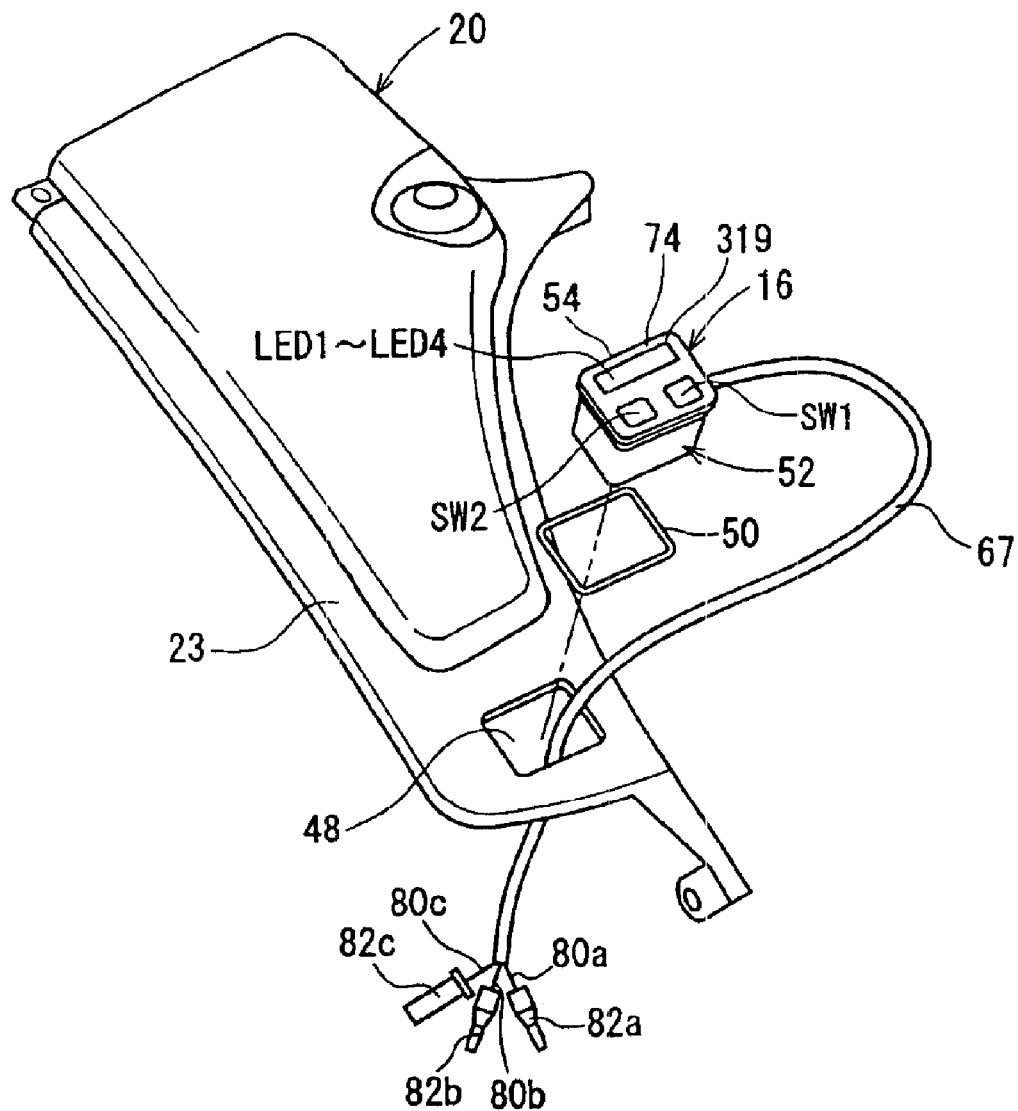
FIG. 3 is a perspective view of a heater control unit (also referred to as a switch unit) of the grip heater control apparatus, which is to be installed on the motorcycle.

For installing the heater control unit 16 in an installation hole 48 defined in an upper panel of the left cowling 23, as shown in FIG. 3, the heater control unit 16 is put into the installation hole 48 with an O-ring 50 of an elastomeric material being sandwiched between a cover 54 (to be described later on) of the heater control unit 16 and the upper panel of the left cowling 23. The O-ring 50 is effective to prevent the heater control unit 16 from contacting the upper panel of the left cowling 23 when the heater control unit 16 is vibrated. Therefore, the heater control unit 16 has its durability maintained against deterioration.

Figure 4:
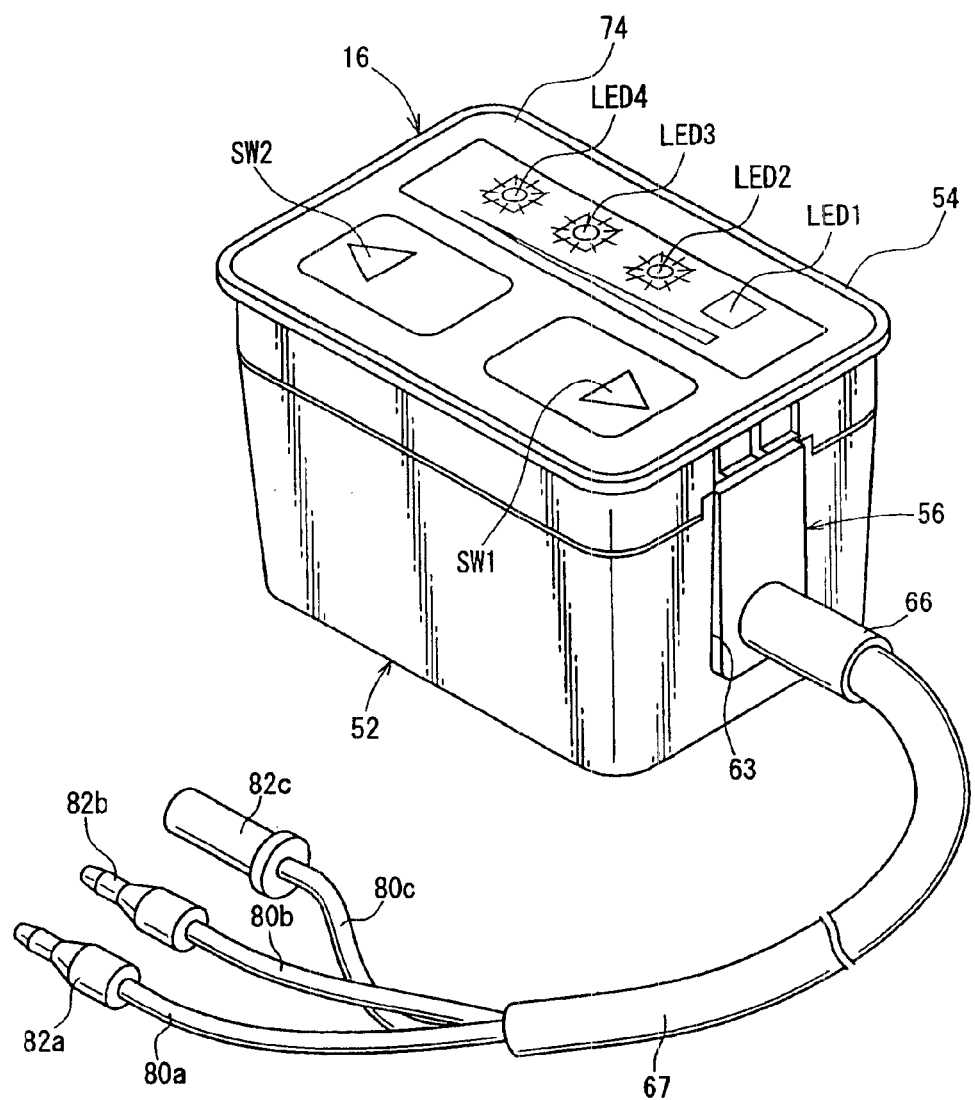
FIG. 4 is a perspective view of the heater control unit of the grip heater control apparatus.
Figure 5:
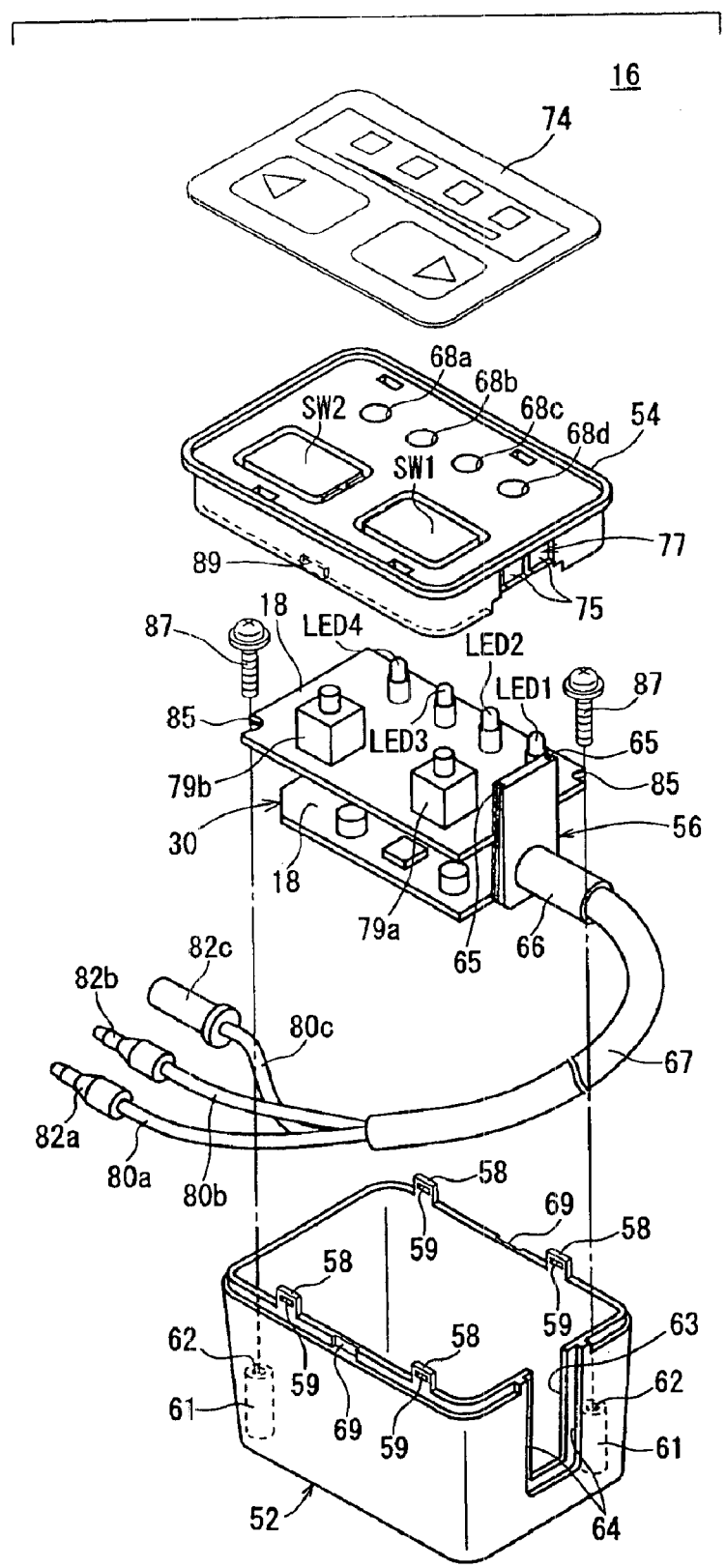
FIG. 5 is an exploded perspective view of the heater control unit of the grip heater control apparatus.

As shown in FIGS. 4 and 5, the heater control unit 16 is in the shape of an elongated rectangular parallelepiped and comprises a bottomed casing 52, a cover 54 mounted on an upper end of the casing 52, and a cable extractor 56 disposed on one side of the casing 52.

As shown in FIG. 5, the casing 52 has four engaging teeth 58 projecting upwardly from the upper end of the casing 52 and having respective engaging holes 59 defined therein near upper distal ends thereof.

The casing 52 also has a pair of diagonally opposite board mounts 61 disposed therein at respective corners thereof. The board mounts 61 have a cylindrical shape having a predetermined length from the bottom of the casing 52. The board mounts 61 have respective screw holes 62 defined substantially centrally therein.

The casing 52 has a substantially rectangular elongate mount hole 63 defined in a side panel thereof, the mount hole 63 being open upwardly. The cable extractor (connector) 56, which is made of an elastomeric material such as rubber or the like, covers the mount hole 63. The casing 52 has rails 64 extending along the opposite edges of the mount hole 63 and having a thickness smaller than the thickness of the casing 52. The rails 64 have a predetermined width from the opposite edges of the mount hole 63.

The cable extractor 56 has grooves 65 defined in respective opposite vertical side edges thereof. The grooves 65 have a depth which is substantially the same as the width of the rails 64.

The cable extractor 56 also has an insertion sleeve 66 projecting a predetermined length from a lower portion thereof in a direction away from the casing 52. A switch cable 67 has an end portion extending through the insertion sleeve 66 and is connected to two control circuits (also referred to as control circuit boards) 18, described later on, disposed in the casing 52.

Figure 8:
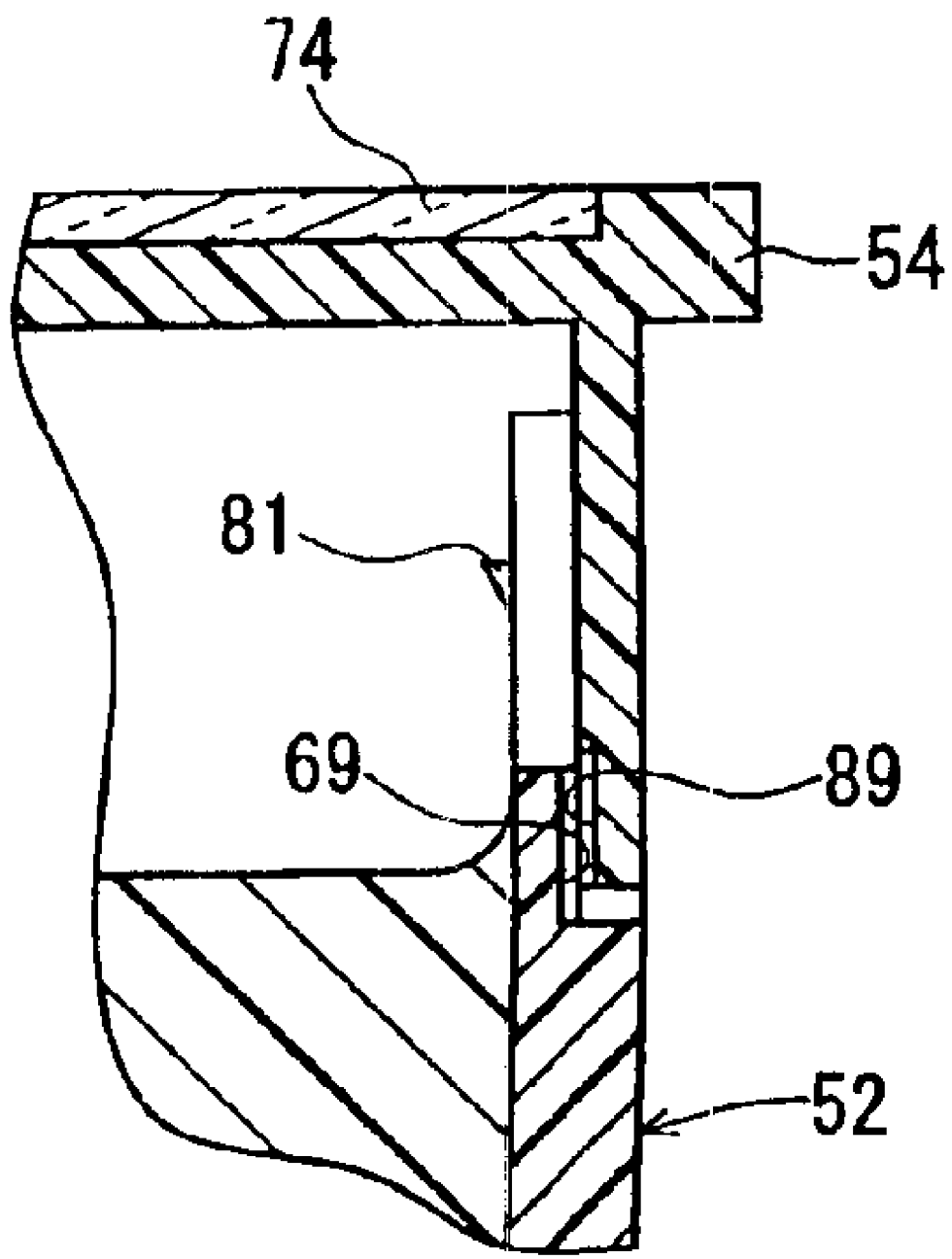
FIG. 8 is an enlarged fragmentary cross-sectional view of first and second water removal grooves in the grip heater control apparatus.

As shown in FIG. 8, the casing 52 has a first water removal groove 69 defined in each of opposite side panels thereof between the engaging teeth 58 that are spaced from each other. The first water removal groove 69 is concaved a predetermined depth from an outer wall surface of the side panel. The casing 52 thus has a pair of first water removal grooves 69 in its opposite side panels.

As shown in FIG. 5, the cover 54 has a linear array of holes 68a–68d defined in an upper surface thereof and receiving respective LED4–LED1 therein. The cover 54 supports thereon an up switch SW1 and a down switch SW2 which are disposed alongside of the linear array of holes 68a–68d and spaced a predetermined distance from each other.

The LED4–LED1 received in the respective holes 68a–68d do not project upwardly from the upper surface of the cover 54. The up switch SW1 and the down switch SW2 comprise button switches, respectively, typically in the form of key switches that can produce tactile clicks when pressed. The buttons of the up switch SW1 and the down switch SW2 lie substantially flush with the upper surface of the cover 54, and hence do not project upwardly from the upper surface of the cover 54.

A thin transparent sheet 74 made of a synthetic resin material is integrally mounted on the upper surface of the cover 54, thus covering the holes 68a–68d. The upper panel of the cover 54 on which the sheet 74 is mounted is slightly larger outwardly than the area enclosed by the outer wall surface of the casing 52 and the outer wall surface beneath the cover 54.

Figure 9:
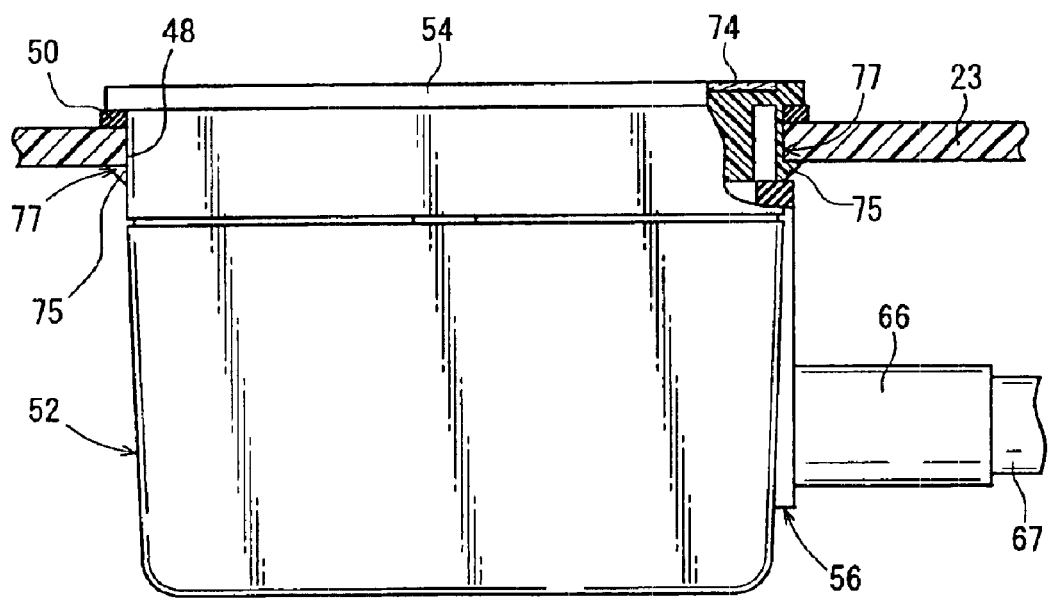
FIG. 9 is a cross-sectional view, partly cut away, taken along line IX—IX of FIG. 1.

As shown in FIG. 9, the cover 54 has a pair of retainers 77 on each of its opposite sides and having respective teeth 75 projecting outwardly and slanted a predetermined angle upwardly. The retainers 77 are slightly bent inwardly of the cover 54.

Figure 7:
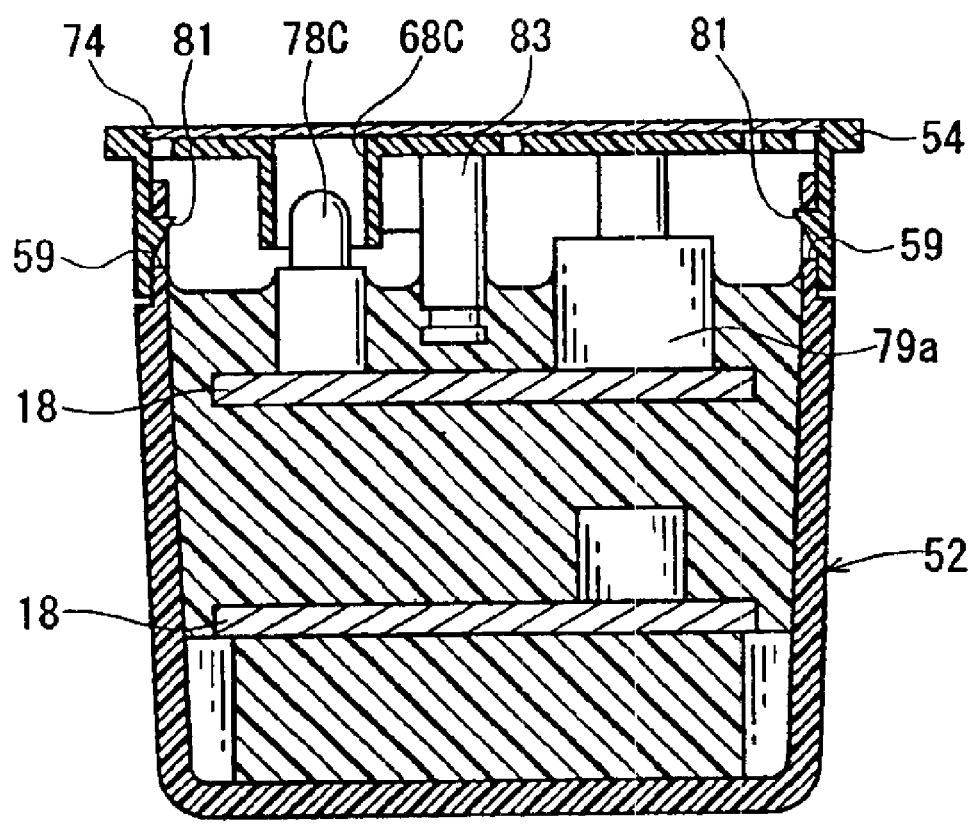
FIG. 7 is a vertical cross-sectional view of the heater control unit of the grip heater control apparatus.

As shown in FIG. 7, the cover 54 has four engaging teeth 81 projecting from inner wall surfaces thereof and slanted a predetermined angle upwardly. When the cover 54 is mounted on the upper end of the casing 52, the engaging teeth 81 are locked in the respective engaging holes 59.

As shown in FIG. 8, the cover 54 has a pair of second water removal grooves 89 defined in respective inner wall surfaces thereof at positions confronting the first water removal grooves 69 in the casing 52. When the cover 54 is mounted on the upper end of the casing 52, the first water removal grooves 69 and the second water removal grooves 89 face each other, creating a clearance therebetween for discharging water stored in the casing 52 through the junction between the casing 52 and the cover 54.

As shown in FIG. 7, a cylindrical post 83 projects a predetermined length downwardly from a substantially central region of the cover 54. The length of the cylindrical post 83 is selected such that it does not contact an upper surface of the upper one of the control circuits 18 which are disposed in the casing 52 when the cover 54 is mounted in place on the casing 52.

The two control circuits 18 of the controller 30 are placed substantially parallel to each other in the heater control unit 16. As shown in FIG. 5, the four LED4–LED1 are mounted on the upper surface of the upper control circuit 18 in a linear array so as to be aligned with the respective holes 68a–68d in the cover 54. The upper surface of the upper control circuit 18 also supports thereon upwardly projecting switches 79a, 79b disposed in alignment with the up switch SW1 and the down switch SW2, respectively.

The upper control circuit 18 has a pair of semicircular recesses 85 defined in diametrically opposite corners thereof such that they are vertically aligned with the respective board mounts 61 in the casing 52 when the lower control circuit 18 is placed on the upper surfaces of the board mounts 61 and the upper control circuit 18 is placed in the casing 52 over the lower control circuit 18.

For assembling the control circuits 18 in the casing 52, the lower control circuit 18 is placed on the upper surfaces of the board mounts 61, and then the upper control circuit 18 is placed over the lower control circuit 18 by screws 87 that are inserted through the respective recesses 85 and threaded into the screw holes 62 in the board mounts 61.

After the control circuits 18 are placed substantially parallel to each other in the casing 52 with the LED4–LED1 positioned upwardly, a molten thermosetting synthetic resin material (hereinafter referred to as a thermosetting resin) such as epoxy resin or the like is poured under pressure into the casing 52 and solidified, thus integrally joining the casing 52 and the control circuits 18 to each other, as shown in FIG. 7.

As a result, the thermosetting resin introduced into and solidified in the casing 52 is effective to protect the control circuits 18 from foreign matter including water, dust, etc.

The switch cable 67 connected to the control circuits 18 comprises three first through third switch harnesses 80a–80c, and extends out of the casing 52 through the insertion sleeve 66 of the cable extractor 56. The first through third switch harnesses 80a–80c are encased in a tubular switch cable 67 made of an elastomeric material.

Connection terminals 82a–82c made of metal are mounted respectively on the tip ends of the first through third switch harnesses 80a–80c and are connected to respective connection terminals 104a–104c (see FIG. 1), to be described later on, of the branch cable 32.

As shown in FIG. 1, the branch cable 32 is tetrafurcated, and held in position between the front fork members 12 (see also FIG. 2) and L-shaped clamps 84a, 84b (see also FIG. 2).

The branch cable 32 comprises a first branch 86 connected to the heater cable 40a, a second branch 88 connected to the heater cable 40b, as shown in FIG. 2, a third branch 90 connected to the switch cable 67, as shown in FIG. 1, and a fourth branch 92 having the connector 34a which is connected to a connector 34b on the end of the wire (also called a battery cable) 36.

The first branch 86 of the branch cable 32 comprises two first joint harnesses 94a, 94b, and connection terminals 96a, 96b made of metal are mounted respectively on the tip ends of the first joint harnesses 94a, 94b.

The first joint harnesses 94a, 94b are connected to the first heater harnesses 42a, 42b when the connection terminals 96a, 96b and the connection terminals 46a, 46b of the heater cable 40a are connected to each other.

As shown in FIG. 2, the second branch 88 of the branch cable 32 comprises two second joint harnesses 98a, 98b, and connection terminals 100a, 100b made of metal are mounted respectively on the tip ends of the second joint harnesses 98a, 98b.

The second joint harnesses 98a, 98b are connected to the first heater harnesses 44a, 44b when the connection terminals 100a, 100b and the connection terminals 46a, 46b of the heater cable 40b are connected to each other.

As shown in FIG. 1, the third branch 90 of the branch cable 32 comprises three third joint harnesses 102a–102c, and connection terminals 104a–104c made of metal are mounted respectively on the tip ends of the third joint harnesses 102a–102c.

The third joint harnesses 102a–102c are connected to the first through third switch harnesses 80a–80c when the connection terminals 104a–104c and the connection terminals 82a–82c of the switch cable 67 are connected to each other.

Figure 11:
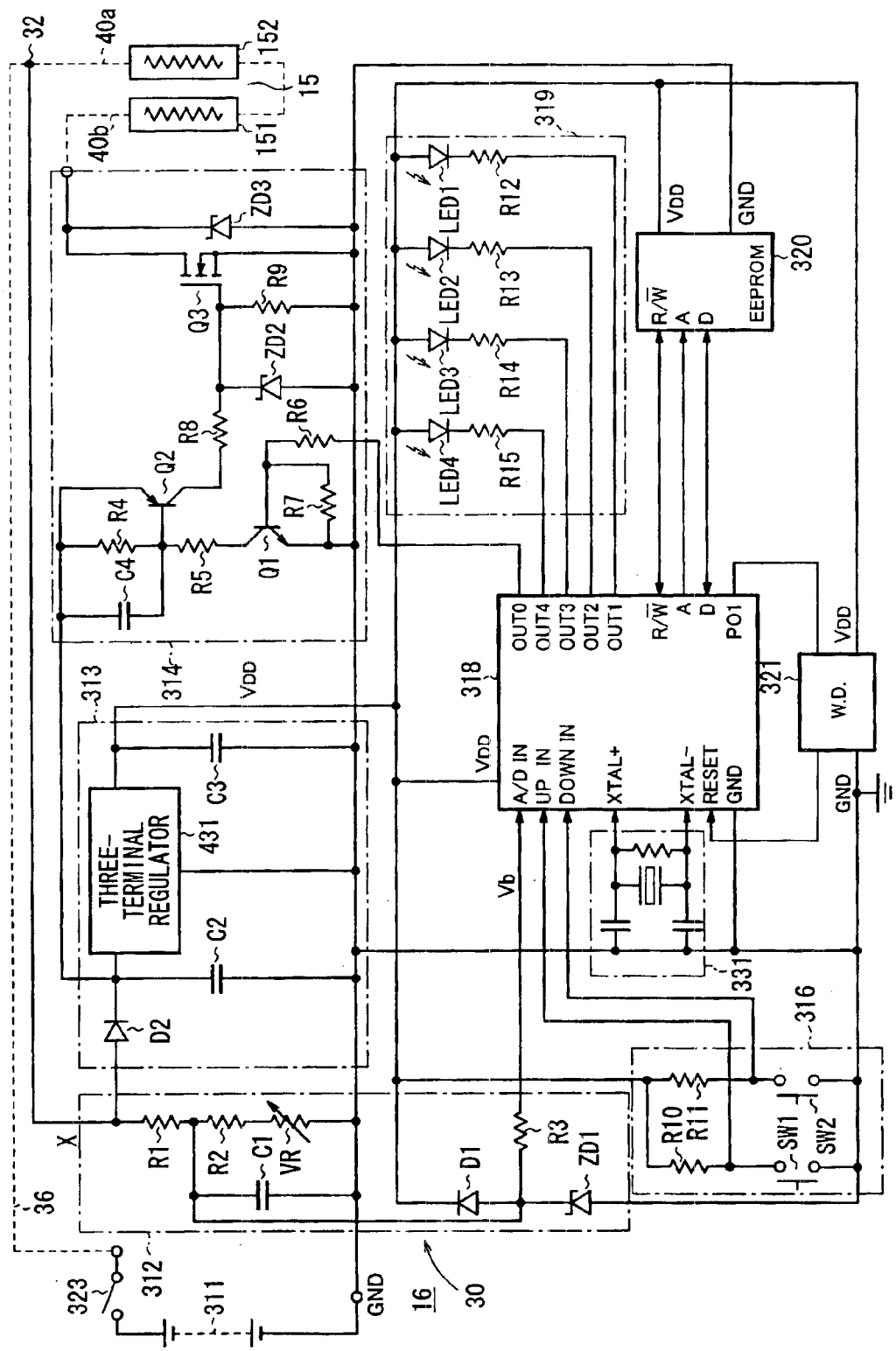
FIG. 11 is a block diagram of a circuit arrangement of the grip heater control apparatus.
Figure 12:
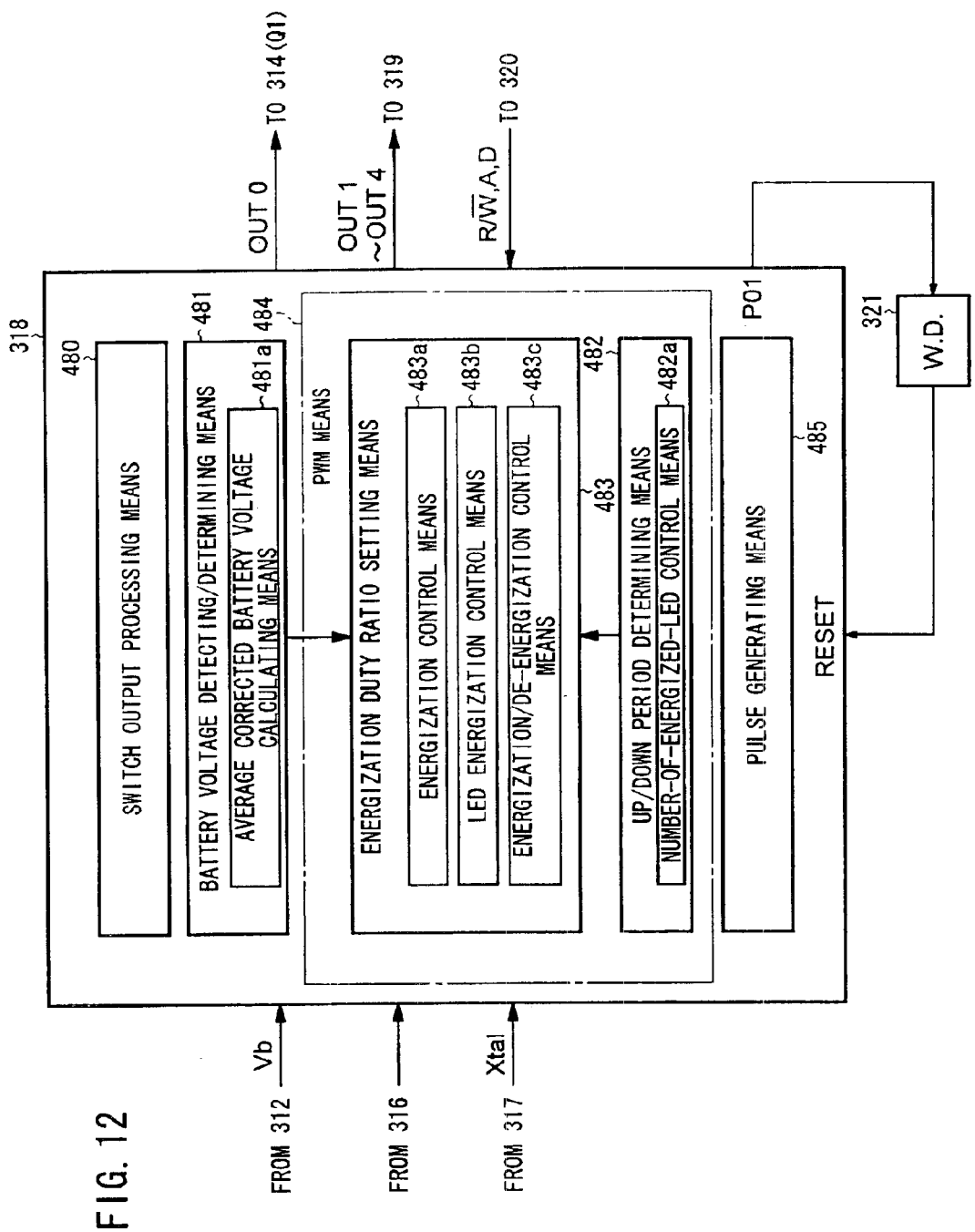
FIG. 12 is a block diagram showing functions of a control circuit of the grip heater control apparatus.
Figure 13:
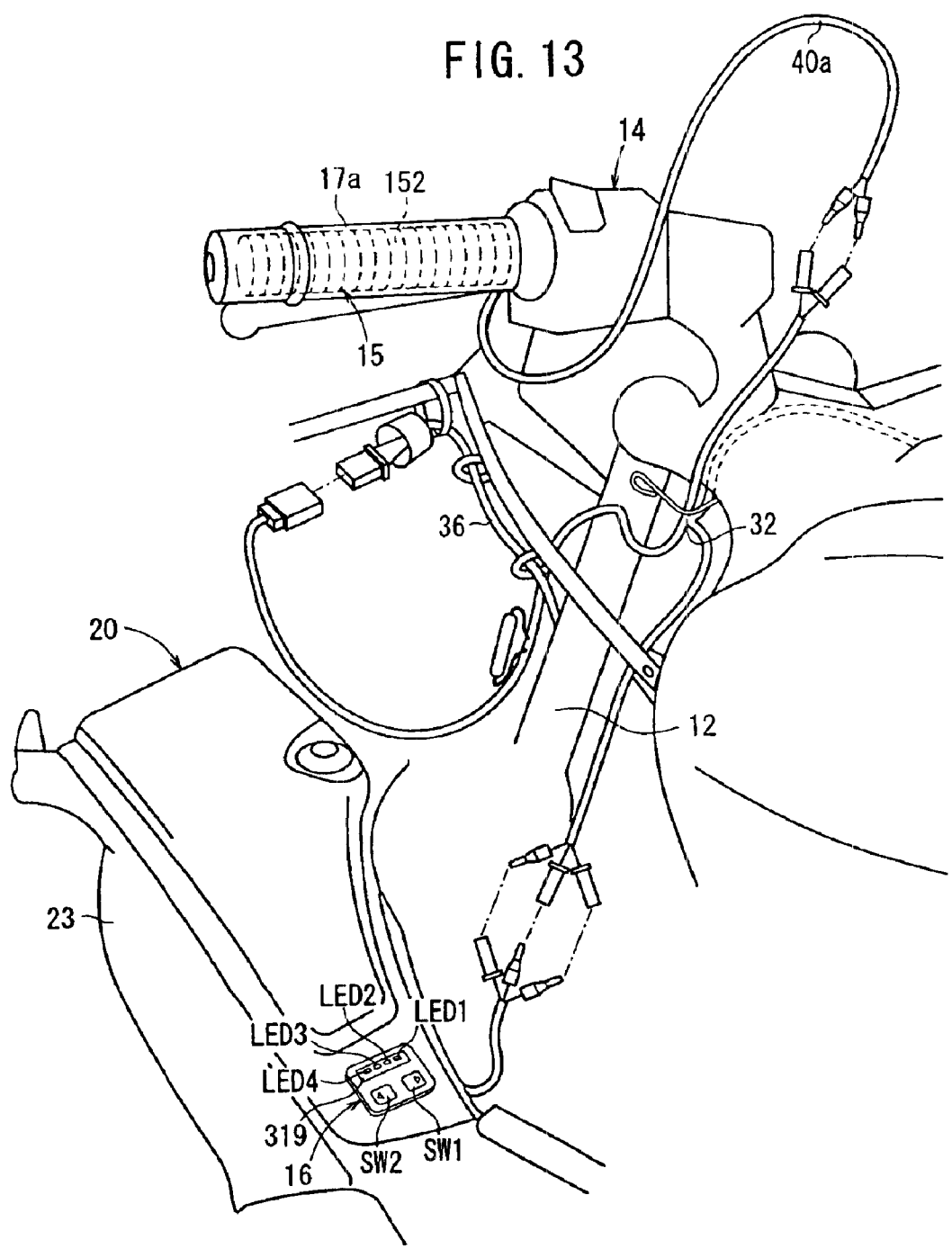
FIG. 13 is a perspective view of the front left portion of the motorcycle shown in FIG. 1.

FIG. 11 shows in block form a circuit arrangement of the grip heater control apparatus 10. FIG. 12 shows in block form functions of a control circuit (control integrated circuit) 318 of the grip heater control apparatus 10. The control circuit 318 is mounted on the control circuit (control circuit board) 18. FIG. 13 shows in perspective the front left portion of the motorcycle shown in FIG. 1 where the grip heater control apparatus 10 is installed.

As shown in FIG. 13, which is an enlarged view of FIG. 1, the front fork members 12 in the form of pipes are mounted on the front end of the motorcycle frame, with the front wheel (not shown) being rotatably supported on the front fork members 12. Cylindrical steering handles 14 for steering the front wheel are mounted on the upper ends of the front fork members 12 by the steering column and extend horizontally in opposite directions. The left grip 17a made of rubber or the like is mounted on the left end of the steering handle 14. The right grip 17b made of rubber or the like is mounted on the right end of the steering handle 14.

The cowling 20 made of a synthetic resin material is integrally mounted on the vehicle frame for reducing air resistance that is applied when the motorcycle is in motion. The cowling 20 has the left cowling 23 on the left side of the vehicle frame and the right cowling 24 on the right side of the vehicle frame.

The grip heater control apparatus 10 comprises the heater 15 (which collectively refers to the heaters 151, 152), each in the form of flexible printed-wiring board or the like, incorporated in the left grip 17a and the non-illustrated right grip, and the switch unit serving as the heater control unit 16 for displaying a temperature setting for the heater 15 and setting a current of the heater 15.

As shown in FIG. 13, the heater control unit 16 is embedded in the left cowling 23, and has an upper portion slightly raised from the surface of the left cowling 23.

As shown in FIG. 11, the controller 30 disposed in the heater control unit 16 basically comprises a battery voltage dividing circuit 312, a constant-voltage circuit 313, a switching circuit 314, a switch unit 316, a control circuit 318, a LED unit 319, an EEPROM 320, and a watchdog circuit (WD) 321.

The controller 30 operates as follows: The battery voltage dividing circuit 312 divides the battery voltage supplied from the battery 311 on the motorcycle via a main switch 323, and outputs a divided voltage Vb based on the battery voltage.

The battery voltage dividing circuit 312 also outputs the voltage from the battery 311 via the main switch 323 to the constant-voltage circuit 313, which outputs a constant voltage $V_{DD}$. The switching circuit 314 switches the voltage supplied from the battery 311 via the main switch 323 to selectively energize and de-energize the heater 15 with the battery 311 for thereby controlling the amount of heat generated by the heater 15. In the present embodiment, the switching circuit 314 functions as a switching means for turning on and off the grip heater 15 on the steering handle 14 with the battery 311.

The battery voltage dividing circuit 312 comprises a pair of series-connected resistors R1, R2 and a variable resistor VR for dividing the battery voltage, and a resistor R3 for outputting the divided voltage Vb therethrough. The battery voltage dividing circuit 312 also has a smoothing capacitor C1, a diode D1 for preventing a current from flowing back under the constant voltage $V_{DD}$ and providing a path for discharging the capacitor C1, and a zener diode ZD1 for limiting an upper limit of the divided voltage Vb to a zener voltage.

The constant-voltage circuit 313 has a rectifying diode D2, a smoothing capacitor C2, a three-terminal regulator 431 for controlling the battery voltage which has been rectified by the diode D2 and smoothed by the capacitor C2 at the constant voltage $V_{DD}$, and a capacitor C3 for smoothing the constant voltage $V_{DD}$ outputted from the three-terminal regulator 431. The constant voltage $V_{DD}$ is used as a power supply voltage for the heater control unit 16, the control circuit 318, the LED unit 319, the EEPROM 320, and the watchdog circuit (WD) 321 of the grip heater control apparatus 10.

The switching circuit 314 comprises a transistor Q1 as a preamplifier which can be turned on and off by an output signal from a terminal OUT0 of the control circuit 318 to control the voltage applied when the battery voltage supplied from the battery 311 via the main switch 323 is rectified by the diode D2 and smoothed by the capacitor C2, a transistor Q2 as a driver which can be turned on and off by an output signal from the collector of the transistor Q1, and a power transistor Q3 which can be turned on and off by an output signal from the collector of the transistor Q2, for thereby turning on and off the series-connected heaters 151, 152 on the respective grips 17b, 17a of the steering handle 14 with the current from the battery 311.

The switching circuit 314 has resistors R6, R7 serving as bias resistors for the transistor Q1, resistors R4, R5 serving as load resistors on the collector of the transistor Q1, a smoothing capacitor C4, resistors R8, R9 serving as bias resistors for the transistor Q3, which can be turned on and off by the output of the transistor Q2, a zener diode ZD2 for limiting a voltage, and a zener diode ZD3 serving as a surge absorber.

While the terminal OUT0 of the control circuit 318 has a high potential, the transistors Q1, Q2, Q3 are turned on, energizing the heater 15 with the current supplied from the battery 311 via the main switch 323. While the terminal OUT0 of the control circuit 318 is a low potential, the transistors Q1, Q2, Q3 are turned off, de-energizing the heater 15.

The switch unit 316 has the up switch SW1 and the down switch SW2. When the up switch SW1 is pressed, the potential of terminal UP IN of the control circuit 318, which is pulled up to the constant voltage $V_{DD}$ by a resistor R10, is low, and instructs an increase in the energization period of the heater 15. When the down switch SW2 is pressed, the potential of terminal DOWN IN of the control circuit 318, which is pulled up to the constant voltage $V_{DD}$ by a resistor R11, is low, and instructs a decrease in the energization period of the heater 15.

The LED unit 319 has the LED1–LED4 which can be turned on and off by output signals from respective terminals OUT1–OUT4 of the control circuit 318. The LED1–LED4 are positioned, one adjacent to another, substantially in an integral linear array.

The LED4, LED3, LED2, LED1 are selectively energized to represent changing energization periods of the heater 15. For example, successive increases in the energization period of the heater 15 are indicated by the sequence of the energization of the LED4 only, the energization of the LED4, LED3, the energization of the LED4, LED3, LED2, and the energization of the LED4–LED1. The LED unit 319 also has resistors R12–R15 serving as resistors for limiting currents flowing to the LED1–LED4.

The EEPROM 320 is a memory for storing and updating the count value of a stage counter, to be described later on, in response to an output signal from the control circuit 318. The stored content of the EEPROM 320 is used as an initial value of the count value of the stage counter when the heater control unit 16 is restarted.

The watchdog circuit 321 monitors an output potential (high potential/low potential) from a terminal PO1 of the control circuit 318 while in operation to detect whether the control circuit 318 is malfunctioning or not. If the control circuit 318 is malfunctioning, then the watchdog circuit 321 resets the control circuit 318 to initialize operation of the control circuit 318.

The control circuit 318 comprises a computer which operates in response to an oscillating output signal from a quartz crystal oscillator 331. As shown in FIG. 12, the control circuit 318 functionally has a switch output processing means 480 responsive to output signals from the up switch SW1 and the down switch SW2 for determining whether the up switch SW1 and the down switch SW2 have been pressed for a predetermined period of time and whether the up switch SW1 and the down switch SW2 have been pressed together, and a battery voltage detecting/determining means 481 responsive to the divided voltage Vb for detecting the battery voltage of the battery 311 and determining whether the battery voltage is in excess of a minimum voltage value required to energize the starter motor of the motorcycle.

The control circuit 318 also functionally has an up/down period determining means 482 responsive to output signals from the up switch SW1 and the down switch SW2 for determining the period in which the up switch SW1 is turned on and the number of times that the up switch SW1 is turned on and determining the period in which the down switch SW2 is turned on and the number of times that the down switch SW2 is turned on, an energization duty ratio setting means 483 for substantially setting the energization of the heater 15 and the duty ratio thereof based on output signals from the up/down period determining means 482 and the battery voltage detecting/determining means 481, and a pulse generating means 485 for generating control pulses, to be outputted from the terminal PO1, indicative of whether the control circuit 318 is normal or malfunctioning.

The battery voltage detecting/determining means 481 includes an average corrected battery voltage calculating means 481a for averaging corrected battery voltages, each produced by adding a voltage drop caused by the wire 36 connected between the heater 15 and the battery 311 to the battery voltage which is detected each time the battery voltage is detected, to determine an average corrected battery voltage.

The up/down period determining means 482 includes a number-of-energized-LED control means 482a for controlling the number of energized LEDs based on the number of times that the up switch SW1 is turned on and controlling the number of de-energized LEDs based on the number of times that the down switch SW2 is turned on, thereby to control the number of energized LEDs.

The energization duty ratio setting means 483 includes (1) an energization control means 483a for turning on and off the switching circuit 314 at an energization ratio determined by the number-of-energized-LED control means 482a for a period of time after the battery voltage has reached an upper limit setting threshold that is equal to the sum of a lower limit setting threshold, at which the heater 15 is inhibited from being energized, and a predetermined voltage, until the battery voltage next reaches the lower limit setting threshold, (2) a LED energization control means 483b for energizing a number of LEDs determined by the number-of-energized-LED control means 482a for a predetermined period of time after the battery voltage has initially reached the upper limit setting threshold from the application of the battery voltage, energizing a number of LEDs determined by the number-of-energized-LED control means 482a for a period of time after the battery voltage has reached the upper limit setting threshold until the battery voltage next reaches the lower limit setting threshold, after elapse of the above predetermined period of time, and de-energizing all the LEDs for a period of time until the battery voltage next reaches the upper limit setting threshold from below the lower limit setting threshold, and (3) an energization/de-energization control means 483c for controlling the switching circuit 314 to inhibit the heater 15 from being energized for a period of time until an average corrected battery voltage, to be described later on, next reaches an upper limit setting threshold that is equal to the sum of a lower limit setting threshold, at which the heater 15 is inhibited from being energized, and a predetermined voltage, from below the lower limit setting threshold, and controlling the switching circuit 314 to allow the heater 15 to be energized for a period of time after the average corrected battery voltage has reached the upper limit setting threshold until the average corrected battery voltage next reaches the lower limit setting threshold.

The up/down period determining means 482 and the energization duty ratio setting means 483 substantially jointly make a PWM means 484.

The grip heater control apparatus 10 according to the embodiment of the present invention is basically constructed as described above. Operation and advantages of the grip heater control apparatus 10 will be described below. First, a process of assembling the heater control unit 16 will be described below.

As shown in FIG. 5, the switch cable 67 connected to the control circuit 18 is inserted through the insertion sleeve 66 of the cable extractor 56, and the lower control circuit 18 is placed on the upper surfaces of the board mounts 61 in the casing 52. At this time, the grooves 65 of the cable extractor 56 are fitted over and slid downwardly along the rails 64 of the casing 52, until the rails 64 are snugly fitted fully in the respective grooves 65. The cable extractor 56 is now firmly placed in the mount hole 63 in the casing 52. Since the mount hole 63 is closed by the cable extractor 56 made of an elastomeric material, foreign matter including water and dust is prevented from entering the casing 52 through the mount hole 63.

The upper control circuit 18 with the LED4–LED1 and the switches 79a, 79b disposed thereon is placed into the casing 52 over the lower control circuit 18, and the screws 87 are inserted through the respective recesses 85 and threaded into the screw holes 62 in the board mounts 61. As a result, the control circuits 18 and the casing 52 are integrally fastened to each other by the screws 87.

Then, as shown in FIG. 7, a molten thermosetting resin is poured under pressure into the casing 52 so as to fill the space in the casing 52 to cover the two control circuits 18. The poured amount of the molten thermosetting resin is selected such that the LED4–LED1 and the switches 79a, 79b disposed on the upper surface of the upper control circuit 18 are not fully covered, i.e., remain exposed, in the casing 52.

The molten thermosetting resin filled in the casing 52 is solidified in a short period of time at the normal temperature. Therefore, the casing 52 and the control circuits 18 are encased together in the thermosetting resin after elapse of a predetermined period of time.

Before the molten thermosetting resin is solidified, the cover 54 is mounted on the upper end of the casing 52. At this time, the holes 68a–68d of the cover 54 and the LED4–LED1 on the upper control circuit 18 are positionally aligned with each other, and the engaging teeth 81 of the cover 54 engage in the respective engaging holes 59 in the engaging teeth 58 for thereby integrally connecting the cover 54 to the casing 52. The cable extractor 56 mounted in the mount hole 63 is also integrally joined to the casing 52 by the solidified thermosetting resin.

The thermosetting resin filled and solidified in the casing 52 is effective to protect the control circuits 18 from foreign matter including water, dust, etc.

The cylindrical post 83 projecting downwardly from the cover 54 is positioned in the molten thermosetting resin that fills the casing 52. Therefore, when the thermosetting resin is solidified, the cylindrical post 83 is firmly retained in the thermosetting resin, securely joining the cover 54 to the casing 52.

Finally, the sheet 74 is mounted on the upper surface of the cover 54.

The heater control unit 16 thus assembled is installed on the left cowling 23 as follows:

As shown in FIG. 3, the switch cable 67 is inserted downwardly through the installation hole 48 defined in the upper panel of the left cowling 23, and the O-ring 50 is fitted upwardly over the outer wall surface of the casing 52. The O-ring 50 has an inner peripheral surface shaped substantially complementarily to the outer wall surface of the casing 52. Therefore, the O-ring 50 is engaged by the upper panel of the cover 54 which is slightly larger outwardly than the area enclosed by the outer wall surface of the casing 52.

Then, as shown in FIG. 9, the heater control unit 16 with the O-ring 50 mounted thereon is inserted downwardly into the installation hole 48. At this time, the o-ring 50 is sandwiched between the upper panel of the cover 54 and the upper surface of the left cowling 23. The teeth 75 of the retainers 77 on the opposite sides of the cover 54 project outwardly from the installation hole 48. Therefore, when the heater control unit 16 is inserted into the installation hole 48, the retainers 77 which are slightly bent inwardly of the cover 54 are elastically pushed inwardly by contact with inner edges of the installation hole 48. When the teeth 75 are displaced beyond the inner edges of the installation hole 48, the retainers 77 spring back outwardly. As a result, the left cowling 23 is retained between the upper surfaces of the teeth 75 and the upper panel of the cover 54, keeping the heater control unit 16 appropriately mounted in place in the installation hole 48. The heater control unit 16 can thus easily be installed firmly on the left cowling 23 simply by inserting itself into the installation hole 48.

Operation and advantages of the grip heater control apparatus 10 which has the heater control unit 16 thus assembled and installed will be described below.

Figure 6:
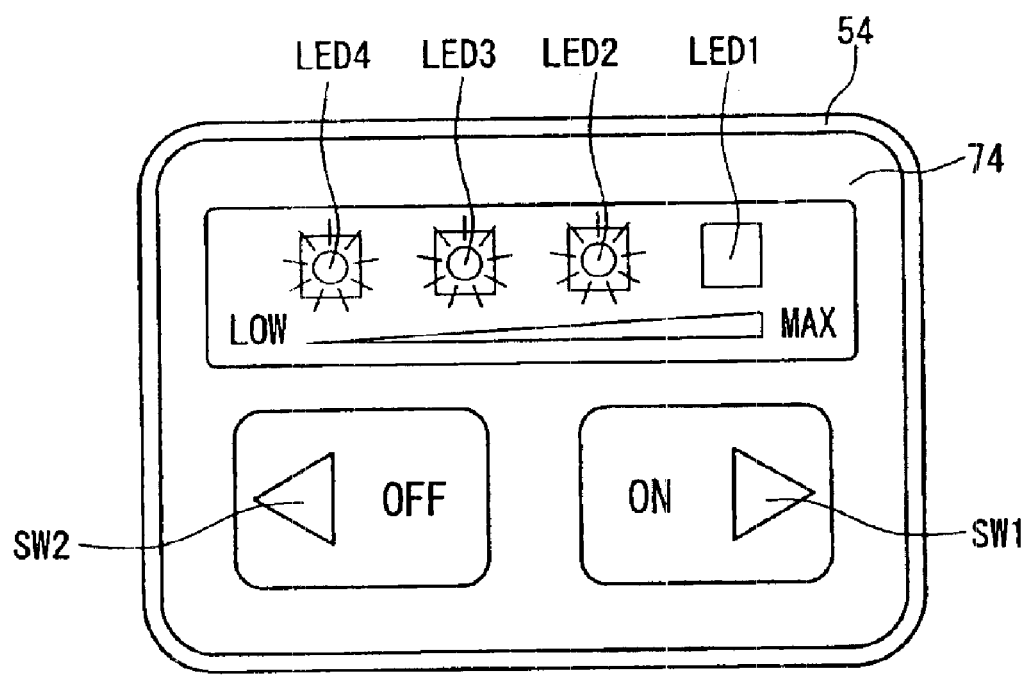
FIG. 6 is a plan view of the heater control unit of the grip heater control apparatus.

When the up switch SW1 mounted on the upper surface of the heater control unit 16 is pressed once from the upper surface of the sheet 74, as shown in FIG. 6, the leftmost LED4 is energized, and the heaters 151, 152 (see FIGS. 1 and 2) are turned on. When the LED4 is energized, it indicates that the heaters 151, 152 are turned on and the temperature setting level of the heaters 151, 152 are set to a lowest level 1.

As shown in FIGS. 1 and 11, a current is supplied from the battery 311 through the wire 36 and the branch cable 32 to the heater control unit 16. The controller 30 (see FIG. 5) in the heater control unit 16 controls the current at an amount of electricity depending on the temperature setting level, and the current controlled by the controller 30 is supplied through the branch cable 32 to the heaters 151, 152 in the respective left and right grips 17*a*, 17*b* (see FIGS. 1 and 2). When the current is supplied to the flexible printed-wiring boards functioning as the heaters 151, 152, the heaters 151, 152 heat the left and right grips 17*a*, 17*b* disposed therearound.

For increasing the temperature of the left and right grips 17*a*, 17*b*, the up switch SW1 on the upper surface of the heater control unit 16 is pressed several times to increase the number of energized LED 4–LED1 successively from the leftmost LED4. The current supplied from the battery 311 through the wire 36 and the branch cable 32 to the heater control unit 16 is controlled by the controller 30 to increase to an amount of electricity depending on the increased number of energized LED 4–LED1. The current increased by the controller 30 is supplied through the branch cable 32 to the heaters 151, 152 in the left and right grips 17*a*, 17*b*, for thereby further heating the left and right grips 17*a*, 17*b* disposed around the heaters 151, 152. In the illustrated embodiment, the heater control unit 16 has four LED4–LED1, and hence the temperature setting level can be increased up to a maximum level 4. However, the number of LEDs used may be increased for setting the temperature of the heaters 151, 152 to a greater number of levels.

For reducing the temperature of the left and right grips 17*a*, 17*b*, the down switch SW2 on the upper surface of the heater control unit 16 is pressed several times to successively de-energize the LED 4–LED1 successively from the rightmost LED1. The current supplied from the battery 311 through the wire 36 and the branch cable 32 to the heater control unit 16 is controlled by the controller 30 to decrease to an amount of electricity depending on the number of de-energized LED 4–LED1.

The current reduced by the controller 30 is supplied through the branch cable 32 to the heaters 151, 152 in the left and right grips 17*a*, 17*b*, for thereby lowering the temperature of the left and right grips 17*a*, 17*b* disposed around the heaters 151, 152.

When the down switch SW2 of the heater control unit 16 is pressed as many times as required to de-energize all the LED 4–LED1, the current supplied from the battery 311 through the wire 36 and the branch cable 32 to the heater control unit 16 is controlled to a nil by the controller 30. As a result, the left and right grips 17*a*, 17*b* are no longer heated by the heaters 151, 152.

Consequently, the temperature to which the left and right grips 17*a*, 17*b* are heated by the heaters 151, 152 is controlled by pressing the up switch SW1 and the down switch SW2, and is visually recognized by the driver of the motorcycle based on the number of energized LED 4–LED1.

In the present embodiment, as described above, the temperature of the heater 15 is electrically adjusted by pressing the up switch SW1 and the down switch SW2. Therefore, the grip heater control apparatus 10 does not employ a variable resistor which has heretofore been used, can be manufactured at a reduced cost, and is made highly durable.

The casing 52 has the engaging teeth 58 projecting upwardly from the upper end of the casing 52 and having the respective engaging holes 59 defined therein near upper distal ends thereof, and the cover 54 has the engaging teeth 81 projecting from the inner wall surfaces thereof for engagement in the respective engaging holes 59. When the cover 54 is installed on the upper end of the casing 52, the engaging teeth 81 engages in the respective engaging holes 59, thereby simply coupling the casing 52 and the cover 54 to each other.

After the control circuits 18 are installed in the casing 52, the thermosetting resin is filled in the casing 52 to firmly secure the control circuits 18 to the casing 52.

Since the cover 54 has the retainers 77 on each of its opposite sides and having the respective teeth 75 projecting outwardly, when the heater control unit 16 with the cover 54 mounted thereon is installed on the left cowling 23, the heater control unit 16 is held in position by the teeth 75 and the cover 54. The heater control unit 16 can thus easily be installed on the left cowling 23.

The temperature setting level of the heaters 151, 152 adjusted by the up switch SW1 and the down switch SW2 can easily be visually recognized with the LED 4–LED1 which are selectively energized depending on the temperature setting level. Therefore, the temperature setting level of the heaters 151, 152 can reliably be confirmed even at night.

Operation of the grip heater control apparatus 10 will be described in greater detail with reference to FIGS. 14 through 23.

Figure 14:
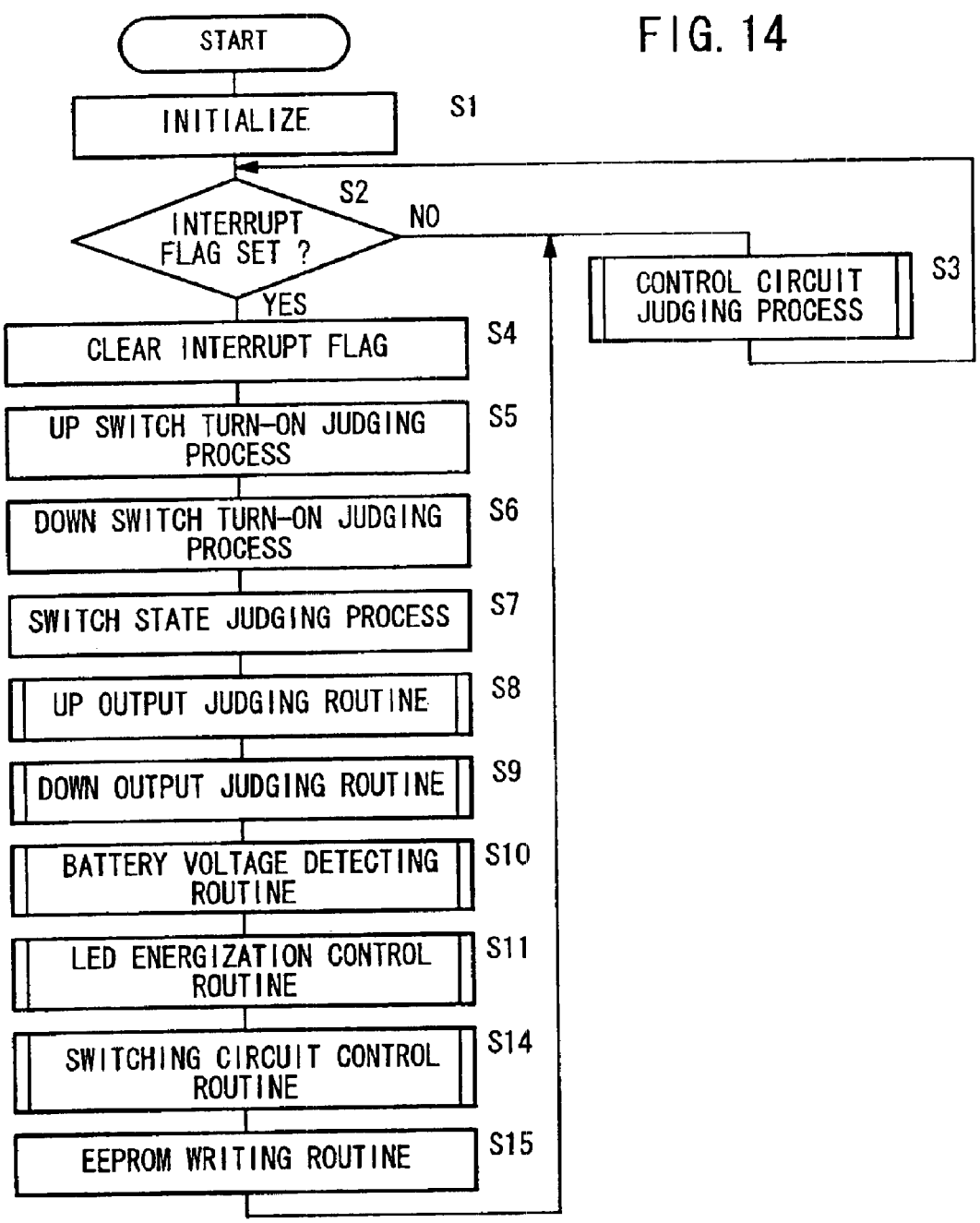
FIG. 14 is a general flowchart of an operation sequence of the grip heater control apparatus.

FIG. 14 is a general flowchart of an operation sequence of the grip heater control apparatus 10.

When the grip heater control apparatus 10 starts to operate, the grip heater control apparatus 10 is initialized, i.e., the count value of the stage counter which has been written in the EEPROM 420 at the end of a previous cycle of operation, i.e., the energized state of the grip heater, is read, an interrupt timer is set to a given time, and various flags are set or cleared in step S1. The interrupt timer is set to 10 ms, for example.

Then, it is determined whether an interrupt flag based on the interrupt timer has been set or not in step S2. The interrupt flag is set in every 10 ms, for example.

If the interrupt flag has not been set in step S2, then a control circuit judging routine is executed in step S3. After the control circuit judging routine, control goes back to step S2.

Figure 15:
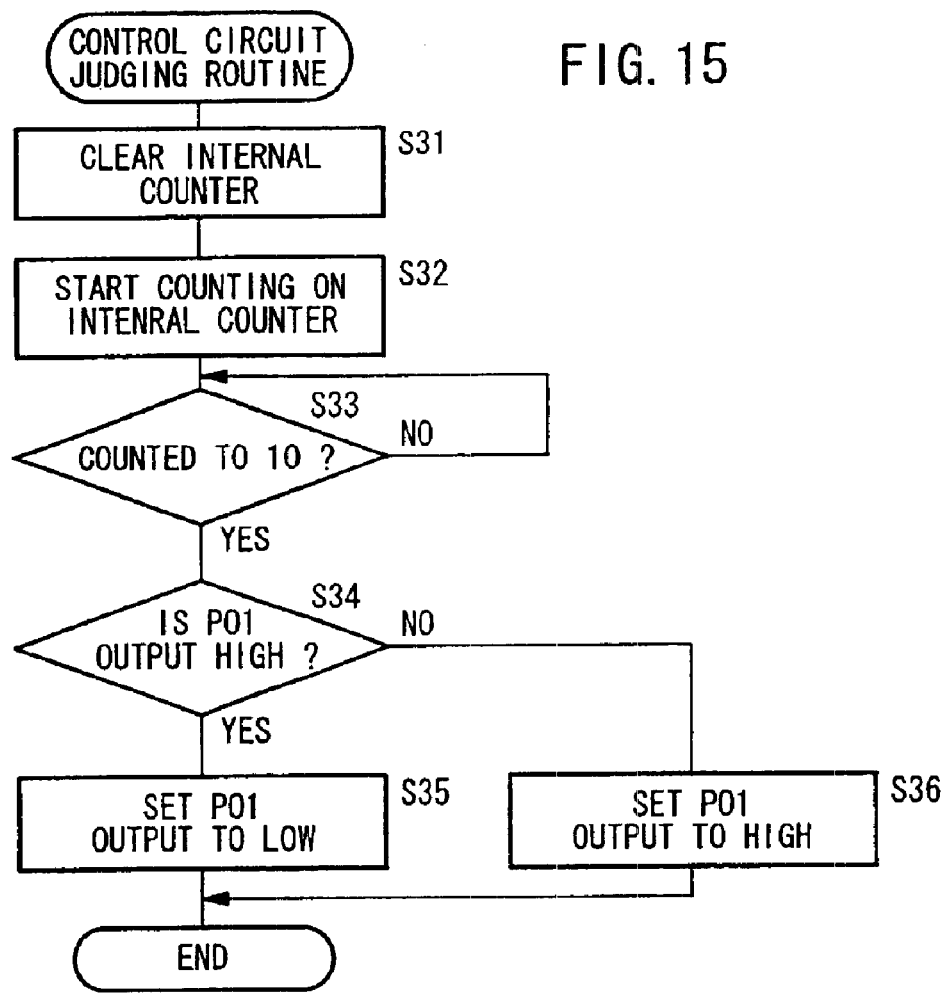
FIG. 15 is a flowchart of a control circuit Judging routine in the operation sequence of the grip heater control apparatus.

In the control circuit judging routine, the watchdog circuit 321 judges, based on an output signal from the terminal PO1 of the control circuit 318, that the control circuit 318 is normal if high and low potentials are alternately repeatedly supplied as the output signal from the terminal PO1. Specifically, as shown in FIG. 15, the watchdog circuit 321 clears the count value of an internal counter in step S31, and then controls the internal counter to start counting in step S32. Then, the watchdog circuit 321 checks if the count value of the internal counter has reached 10 or not. If not, the watchdog circuit 321 waits until the count value of the internal counter reaches 10. If the count value of the internal counter has reached 10, then the watchdog circuit 321 checks if the output signal from the terminal PO1 of the control circuit 318 has a high potential (HIGH) or not in step S34. If the output signal from the terminal PO1 of the control circuit 318 has a high potential, then the output signal from the terminal PO1 is set to a low potential (LOW) in step S35. If the output signal from the terminal PO1 of the control circuit 318 has a low potential in step S34, then the output signal from the terminal PO1 is set to a high potential (HIGH) in step S36. After steps S35. S36, the control circuit judging routine is put to an end.

If it is assumed that the internal counter increments its count in every 0.1 ms, then the count 10 in step S33 is equal to 1 ms. If the control circuit 318 is normal, then step S35 and step S36 are repeated in every 1 ms, and the terminal PO1 of the control circuit 318 alternatively outputs a high potential for 1 ms and a low potential for 1 Ms. If the control circuit 318 is not normal, i.e., is malfunctioning, then step S35 or step S36 is executed for more than 1 ms, and the terminal PO of the control circuit 318 continuously outputs a high potential or a low potential for more than a predetermined processing time (which is equal to the sum of processing times of steps S4–S11, S14, S15 and a processing time of step S3 to be described below).

If the terminal PO1 of the control circuit 318 alternatively outputs a high potential and a low potential as described above, then the watchdog circuit 321 judges that the control circuit 318 is normal. Conversely, if the terminal PO1 of the control circuit 318 continuously outputs a high potential or a low potential for more than the above predetermined processing time, then the watchdog circuit 321 judges that the control circuit 318 is not normal, and applies a resetting signal to a reset terminal of the control circuit 318, resetting the control circuit 318.

If the interrupt flag has been set in step S2 shown in FIG. 14, then the interrupt flag is cleared in step S4. Then, an up switch ON judging routine is carried out in step S5. In the up switch ON judging routine, when the battery voltage is equal to or higher than a predetermined voltage, it is determined whether or not the up switch SW1 has been turned on for a predetermined period or more, e.g., 30 ms or more. If the up switch SW1 has been turned on for a predetermined period or more when the battery voltage is equal to or higher than a predetermined voltage, then the up switch SW1 is judged as being turned on, and an up switch ON flag is set. Thus, the up switch ON judging routine is a routine for determining whether the up switch SW1 is turned on or not. If the down switch SW2 is turned on when the battery voltage is less than a predetermined voltage, or if the down switch SW2 is judged as being turned on within a predetermined period, the operation of the up switch SW1 is made ineffective.

After step S5, a down switch ON judging routine is carried out in step S6. In the down switch ON judging routine, when the battery voltage is equal to or higher than a predetermined voltage, it is determined whether or not the down switch SW2 has been turned on for a predetermined period or more, e.g., 30 ms or more. If the down switch SW2 has been turned on for a predetermined period or more when the battery voltage is equal to or higher than a predetermined voltage, then the down switch SW2 is judged as being turned on, and a down switch ON flag is set. Thus, the down switch ON judging routine is a routine for determining whether the down switch SW2 is turned on or not. If the up switch SW1 is turned on when the battery voltage is less than a predetermined voltage, or if the up switch SW1 is judged as being turned on within a predetermined period, then the operation of the down switch SW2 is made ineffective.

After step S6, a switch state judging routine is carried out in step S7. In the switch state judging routine, the up switch ON flag and the down switch ON flag are checked for their setting. When both the up switch SW1 and the down switch S2 are simultaneously pressed, i.e., when the up switch ON flag and the down switch ON flag are set, both the up switch ON flag and the down switch ON flag are set. When only one of the up switch ON flag and the down switch ON flag is set, and when both the up switch ON flag and the down switch ON flag are not set, the up switch ON-flag and the down switch ON flag are cleared.

As described above, in steps S5 through S7, if only the up switch SW1 is turned on for a predetermined period or more when the battery voltage is equal to or higher than a predetermined voltage, then the up switch SW1 is judged as being turned on, and if only the down switch SW2 is turned on for a predetermined period or more when the battery voltage is equal to or higher than a predetermined voltage, then the down switch SW2 is judged as being turned on.

Figure 16:
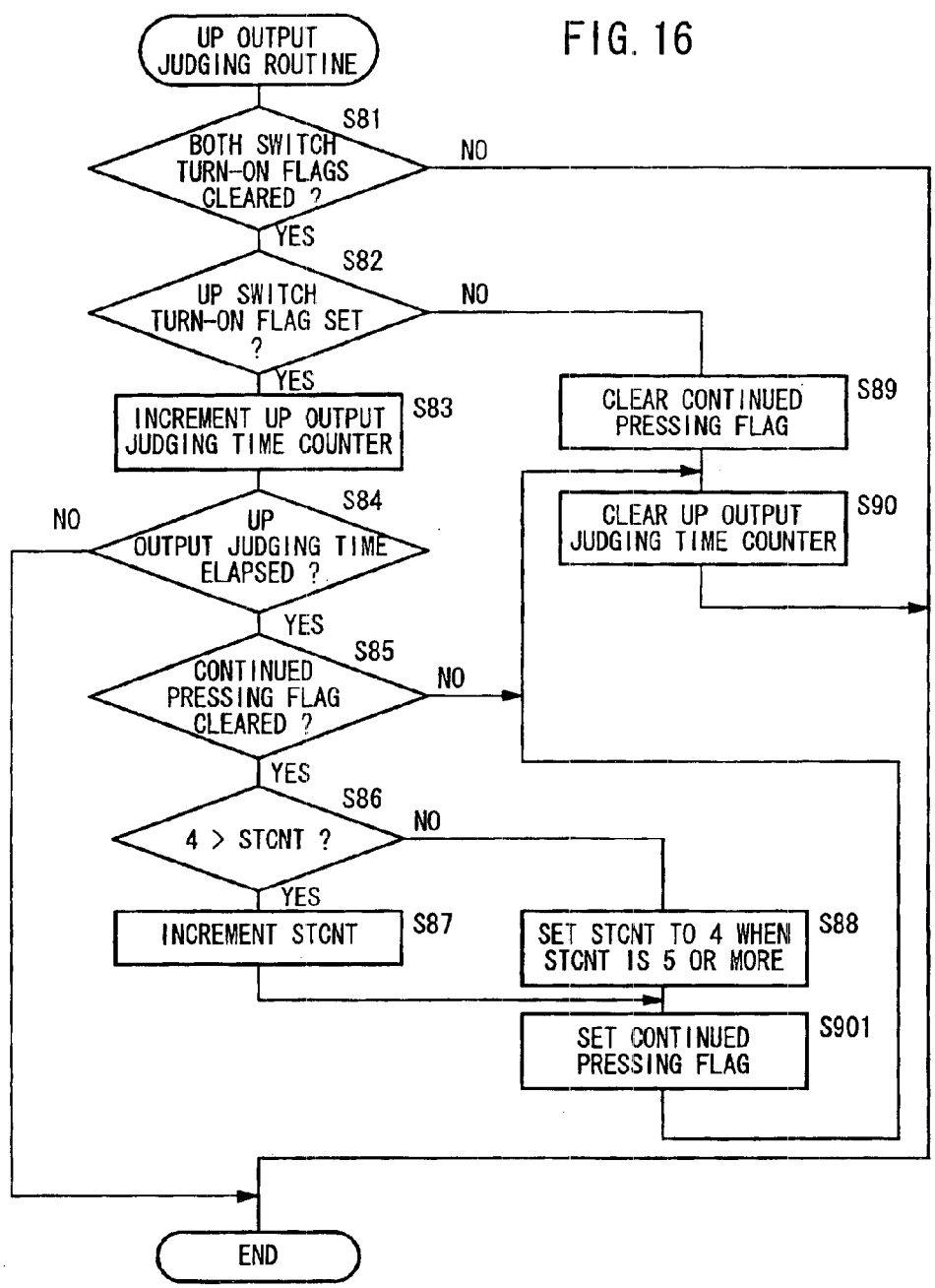
FIG. 16 is a flowchart of an up output judging routine in the operation sequence of the grip heater control apparatus.

After step S7, an up output judging routine is carried out in step S8. In the up output judging routine, as shown in FIG. 16, it is checked whether both the switch ON flags are cleared or not in step S81. If both the switch ON flags are not cleared in step S81, then the up output judging routine is put to an end.

If both the switch ON flags are cleared in step S81, then it is checked whether the up switch ON flag is set or not in step S82.

If the up switch ON flag is set in step S82, then an up output judging time counter is incremented in step 583, and it is checked whether an up output judging time, e.g., 130 ms, has elapsed or not in step S84. If the up output judging time has not elapsed in step S84, then the up output judging routine is put to an end.

If the up output judging time has elapsed in step S84, then it is checked whether a continued pressing flag is cleared or not in step S85. If the continued pressing flag is cleared, then it is checked whether the count value of the stage counter (STCNT) is less than 4 or not in step S86. If the count value of the stage counter is less than 4, then the stage counter is incremented in step S87. The count value of the stage counter represents the number of LEDs to be energized.

If the count value of the stage counter is not less than 4 in step S86, then the count value of the stage counter is set to 4 when the count value of the stage counter is 5 or more in step S88. It is determined whether the count value of the stage counter is less than 4 or not in step S86 because the number of LED1–LED4 is 4. The count value of the stage counter is set to 4 when the count value of the stage counter is 5 or more in step S88 for the same reason.

After steps S87, S88, the continued pressing flag is set in step S901. After step S901, the up output judging time counter is cleared in step S90, after which the up output judging routine is put to an end. If the continued pressing flag is not cleared in step S85, then step S90 is carried out.

If the up switch ON flag is not set in step S82, then the continued pressing flag is cleared in step S89, after which step S90 is carried out. If both the switch ON flags are not cleared in step S81, then they indicate that the up switch SW1 and the down switch SW2 are simultaneously turned on, and the up output judging routine is put to an end.

In the up output judging routine (step S8), when the up switch SW1 is continuously pressed, the continued pressing flag is set, preventing the up switch SW1 from being continuously pressed. When the up switch SW1 is not continuously pressed, i.e., when the continued pressing flag is cleared, the on-time of the up switch SW1 is measured by the up output judging time counter. The count value of the stage counter is incremented in each single ON event of the up switch SW1 in which the output judging time elapses. As described above, in the up output judging routine (step S8), when the up switch SW1 is turned on for the output judging time or more, it is judged as a single ON event of the up switch SW1, and the count value of the stage counter is incremented in each single ON event of the up switch SW1.

Figure 17:
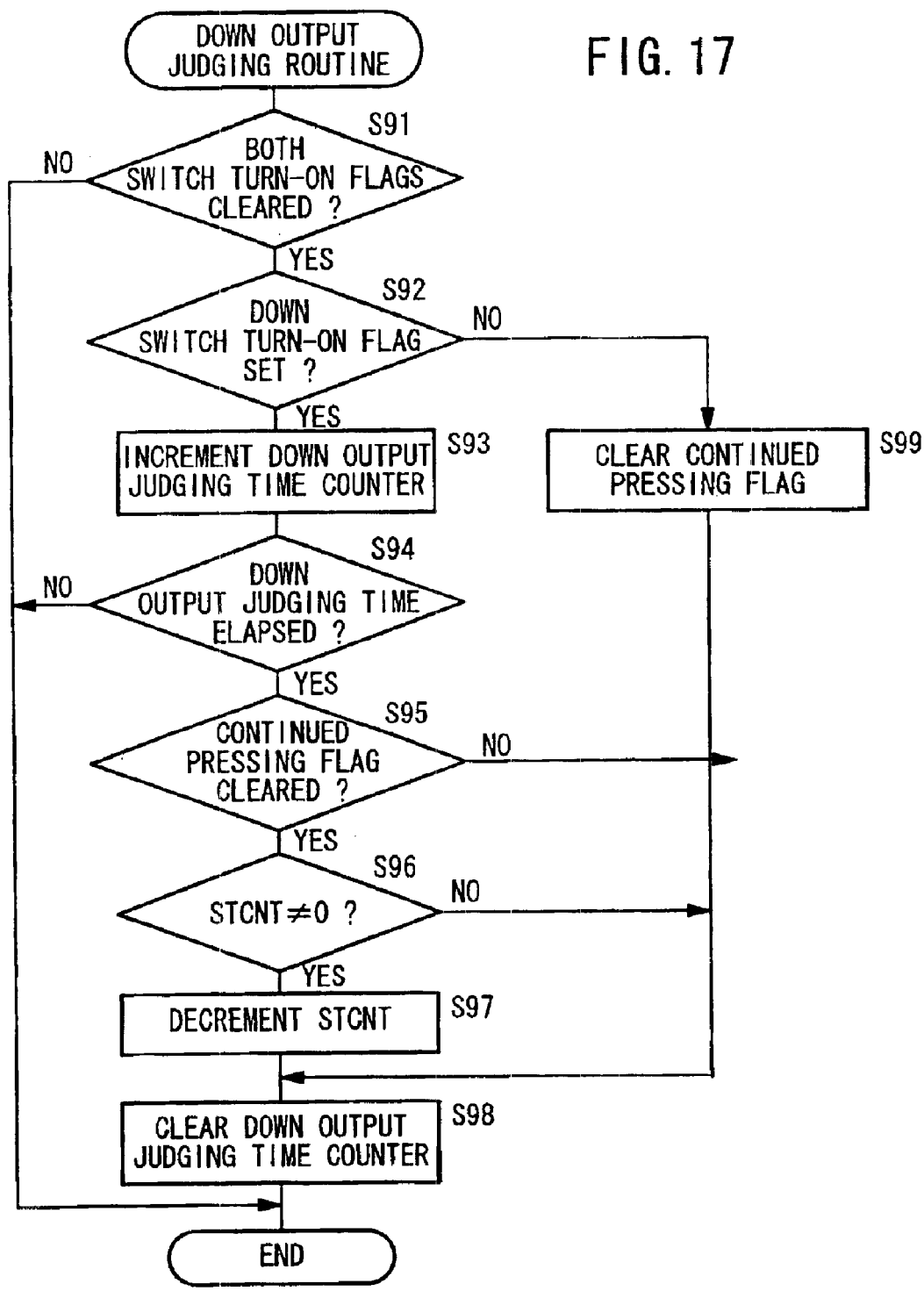
FIG. 17 is a flowchart of a down output judging routine in the operation sequence of the grip heater control apparatus.

After step S8, a down output judging routine is carried out in step S9. In the down output judging routine, as shown in FIG. 17, it is checked whether both the switch ON flags are cleared or not in step S91. If both the switch ON flags are not cleared in step S91, then the down output judging routine is put to an end.

If both the switch ON flags are cleared in step S91, then it is checked whether the down switch ON flag is set or not in step S92.

If the down switch ON flag is set in step S92, then a down output judging time counter is incremented in step S93, and it is checked whether an up output judging time has elapsed or not in step S94. If the down output judging time has not elapsed in step S94, then the up output judging routine is put to an end.

If the down output judging time has elapsed in step S94, then it is checked whether the continued pressing flag is cleared or not in step S95. If the continued pressing flag is cleared, then it is checked whether the count value of the stage counter is 0 or not in step S96. If the count value of the stage counter is not 0, then the stage counter is decremented in step S97.

After step S97, the down output judging time counter is cleared in step S98, after which the down output judging routine is put to an end. If the count value of the stage counter is 0 in step S96, then control skips step S97 and jumps to step S98.

If the down switch ON flag is not set in step S92, then the continued pressing flag is cleared in step S99, after which step S98 is carried out.

In the down output judging routine (step S9), when the down switch SW2 is continuously pressed, the continued pressing flag is set, preventing the down switch SW2 from being continuously pressed. When the down switch SW2 is not continuously pressed, i.e., when the continued pressing flag is cleared, the on-time of the down switch SW2 is measured by the down output judging time counter. The count value of the stage counter is decremented in each single ON event of the down switch SW2 in which the output judging time elapses. As described above, in the down output judging routine (step S9), when the down switch SW2 is turned on for the output judging time or more, it is judged as a single ON event of the down switch SW2, and the count value of the stage counter is decremented in each single ON event of the down switch SW2.

As can also be seen from an LED energization control routine (step S11) and a switching circuit control routine (step S14), the stage counter controls the number of LEDs to be energized and the number of LEDs to be de-energized based on its count value, and also controls periods in which to energize and de-energize the heater 15 with the switching circuit 314.

Figure 18:
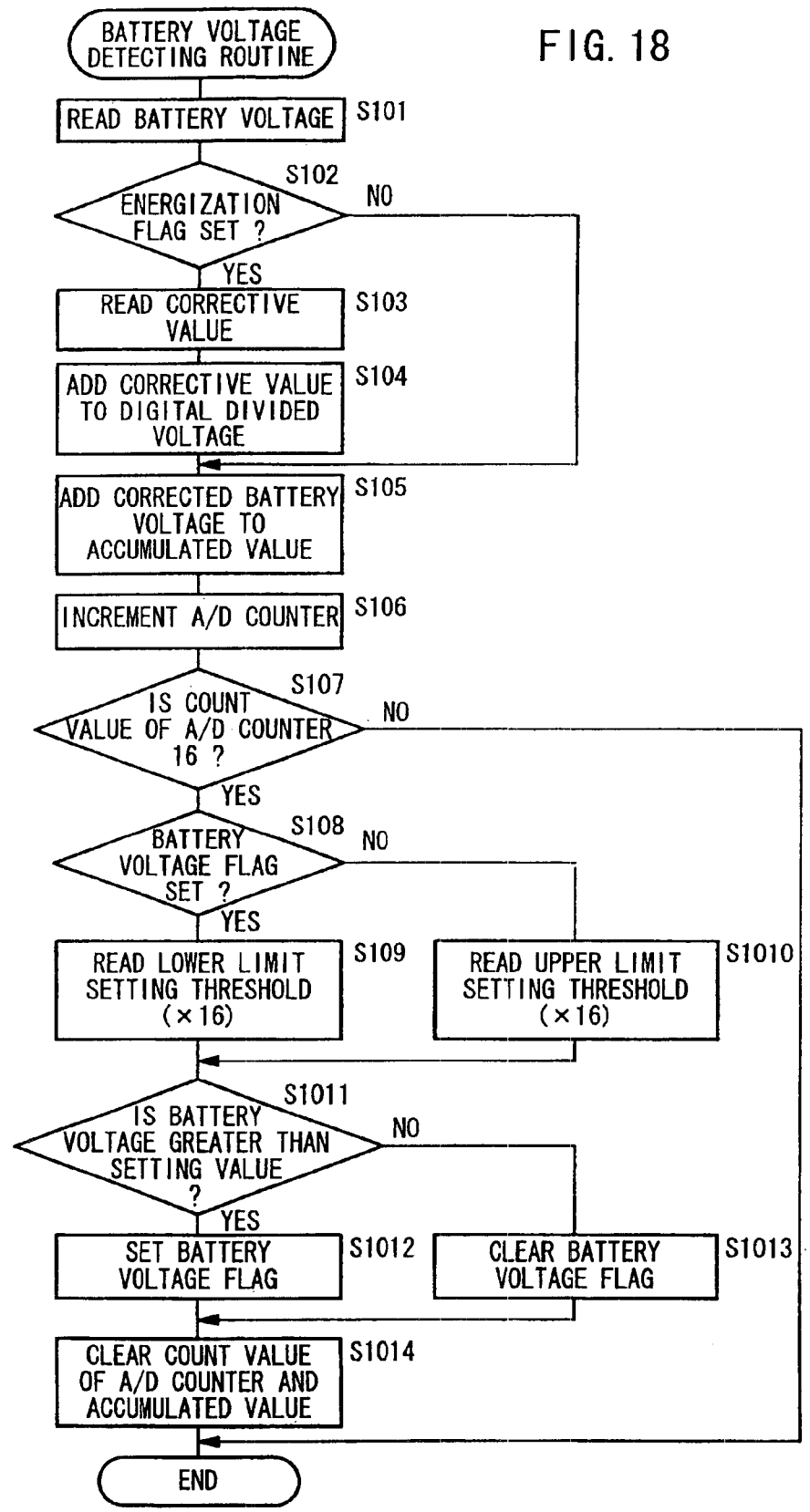
FIG. 18 is a flowchart of a battery voltage detecting routine in the operation sequence of the grip heater control apparatus.

After step S9, a battery voltage detecting routine is carried out in step S10. In the battery voltage detecting routine, as shown in FIG. 18, the divided voltage Vb (also referred to as a battery voltage unless misunderstood in step S10 and descriptions related thereto) which has been converted from an analog value to a digital value based on the battery voltage is read in step S101. Then, it is checked whether an energization flag has been set or not in step S102.

A corrective voltage value for compensating for a voltage drop caused by the wire 36 interconnecting the heater 15, the battery 11, and the grip heater control apparatus 10 upon energization of the heater 15 has been actually measured in advance. The measured corrective voltage value is 0.7 V with the grip heater control apparatus 10, but tends to vary with the type of the motorcycle, i.e., the type of the wire 36, the current flowing through the heater 15, etc. The corrective voltage value is converted into a corrective voltage value (also referred to as a corrective voltage value or a corrective value unless misunderstood in step S10 and descriptions related thereto) based on the voltage-dividing ratio of the voltage dividing circuit 312, and stored in a ROM in the control circuit 318.

If the energization flag has been set in step S102, then the corrective value is read from the ROM in the control circuit 318 in step S103. The corrective value which is read is added to the digital divided voltage Vb, producing a corrected battery voltage in step S104. According to the summing process in step S104, the output voltage across the battery 11 is essentially detected.

After step S104, the corrected battery voltage is added to an accumulated value of corrected battery voltages obtained up to the previous processing cycle in step S105. If the energization flag has not been set in step S102, then steps S103, S104 are skipped and jumps to step S105. After step S105, the count value of an A/D counter representative of the number of accumulations is incremented in step S106.

Then, it is checked whether the count value of the A/D counter is equal to a predetermined value, e.g., 16, or not in step S107. If the count value of the A/D counter is not equal to a predetermined value, then the battery voltage detecting routine is brought to an end.

If the count value of the A/D counter is equal to a predetermined value in step S107, then a battery voltage flag indicative of whether the battery voltage is greater than a setting value, to be described later on, or not has been set or not in step S108.

If the battery voltage flag has been set, then a predetermined lower limit setting threshold (=setting value) of the battery voltage stored in the ROM for inhibiting energization of the heater 15 is read in step S109. The lower limit setting threshold has a value produced by dividing a minimum voltage value required by the battery 11 by the voltage-dividing ratio of the voltage dividing circuit 12. If the battery voltage flag has not been set in step S108, then a predetermined upper limit setting threshold (=setting value), which is produced by adding a voltage preset as a hysteresis to the lower limit setting threshold, of the battery voltage stored in the ROM is read in step S1010. The upper limit setting threshold is based on a value produced by dividing a voltage value by the voltage-dividing ratio of the voltage dividing circuit 312. For example, the upper limit setting threshold is equal to the sum of a value produced as a hysteresis voltage by dividing 0.5 V by the voltage-dividing ratio of the voltage dividing circuit 312 and the lower limit setting threshold.

After steps S109, S1010, it is checked whether an average corrected battery voltage produced by averaging an accumulated value of a predetermined number of, e.g. 16, corrected battery voltages to which corrective values have been added, is greater than a setting value or not in step S1011. If the average corrected battery voltage is greater than the setting value, then the battery voltage flag is set in step S1012. Thereafter, the count value of the A/D counter and the accumulated value are cleared in step S1014, whereupon the battery voltage detecting routine is ended. If the average corrected battery voltage is not greater than the setting value in step S1011, then the battery voltage flag is cleared in step S1013. Thereafter, the count value of the A/D counter and the accumulated value are cleared in step S1014, whereupon the battery voltage detecting routine is ended.

In the battery voltage detecting routine, a predetermined number of, e.g., 16, corrected battery voltages to which corrective values have been added are accumulated in steps S105 through S107, and then the accumulated value is averaged to produce an average corrected battery voltage in step S1010, after which the average corrected battery voltage is compared with the setting value. This is because the average corrected battery voltage accurately represents the output voltage across the battery 11 and decreases the noise.

In the above battery voltage detecting routine (step S10), when the voltage of the battery 11 is initially applied, the battery voltage flag is not set. After step S108, step S1010 is carried out, and the battery voltage flag is cleared in step S1013. When the voltage of the battery 11 is initially applied, the battery voltage is not stable, and the battery voltage is lower than the upper limit setting threshold read in step S1010, after which the battery voltage flag is cleared in step S1013, and the accumulated value is cleared (steps S1010, S1013, S1014). When the battery voltage rises in excess of the upper limit setting threshold upon continued execution of these steps, the battery voltage flag is set in step S1012.

Because the battery voltage flag is set in step S1012, step S109 is carried out in step S108 in a next cycle, and the lower limit setting threshold read in step S109 is used as the setting value in step S1010. The battery voltage flag is continuously set until the battery voltage drops below the lower limit setting threshold. When the battery voltage drops below the lower limit setting threshold, steps S1010, S1011, S1013 are carried out, clearing the battery voltage flag.

Figure 24:
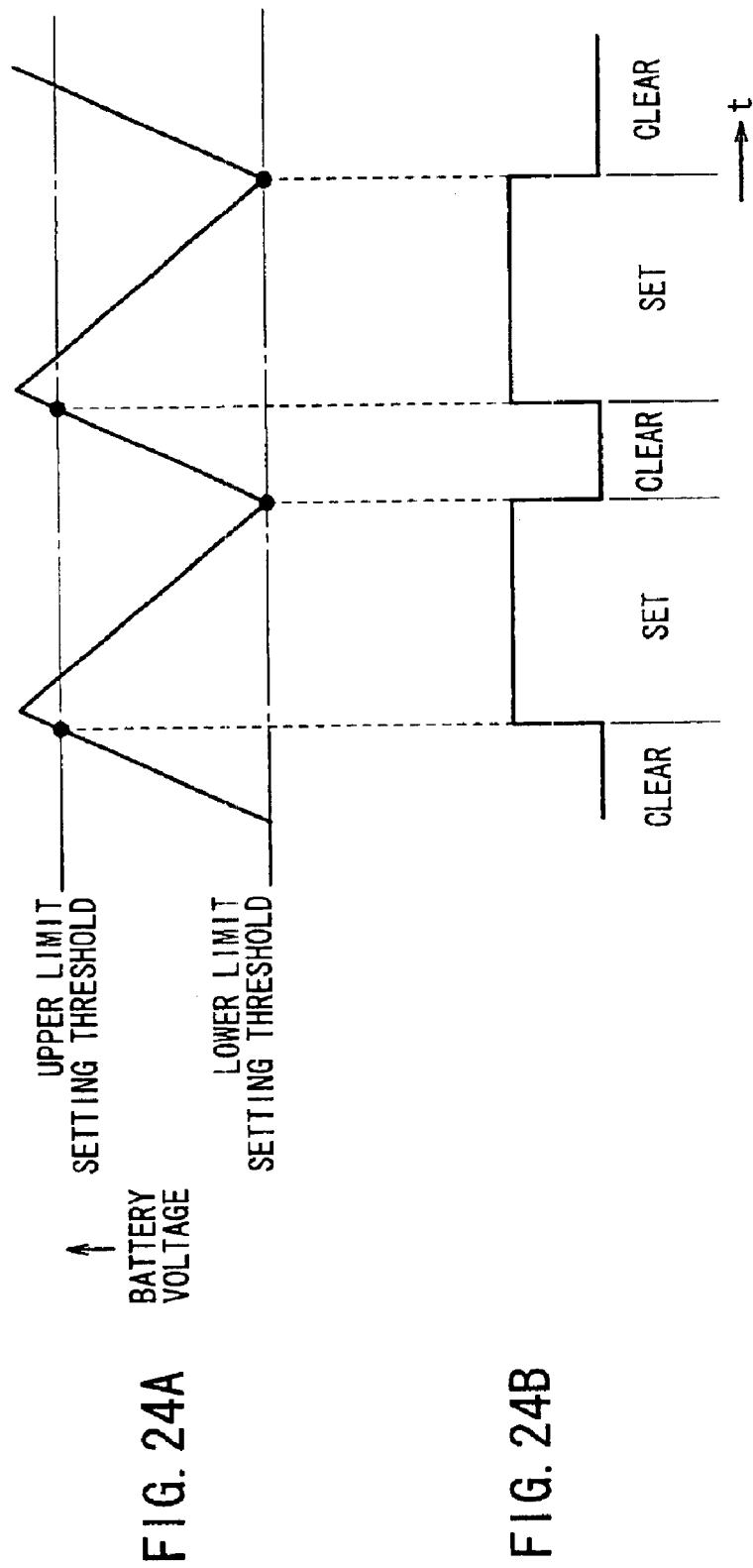
FIG. 24A is a diagram showing a battery voltage in the operation sequence of the grip heater control apparatus.
FIG. 24B is a diagram showing a battery voltage flag depending on the battery voltage.

As a result, the battery voltage flag is set and cleared as the battery voltage varies as shown in FIGS. 24A and 24B, based on the setting values (the upper limit setting threshold and the lower limit setting threshold) which provide a hysteresis. FIG. 24A shows how the battery voltage varies, and FIG. 24B shows how the battery voltage flag is set and cleared.

As described above, since the corrective value representing the voltage drop due to the resistance of the wire 36 at the time the heater 15 is energized is added to the detected battery voltage only when the energization flag is set, the voltage drop due to the resistance of the wire 36 at the time the heater 15 is compensated for. As the accumulated value of a predetermined number of corrected battery voltages is used, noise components introduced when the battery voltage is detected are smoothed, making it unnecessary to use a dedicated low-pass filter for the detection of the battery voltage.

In the above illustrated battery voltage detecting routine, the average corrected battery voltage produced by averaging the accumulated value of corrected battery voltages is compared with the setting value in step S1011. However, rather than the average corrected battery voltage, the accumulated value of corrected battery voltages, e.g., the accumulated value of 16 corrected battery voltages, may be used for comparison with a setting value. In this case, the setting value may be a multiple by 16 of the upper limit setting threshold and the lower limit setting threshold as indicated by (×16) in steps S109, S1010. According to this modification, the effect of noise is also essentially eliminated, and no low-pass filter is required.

Figure 19:
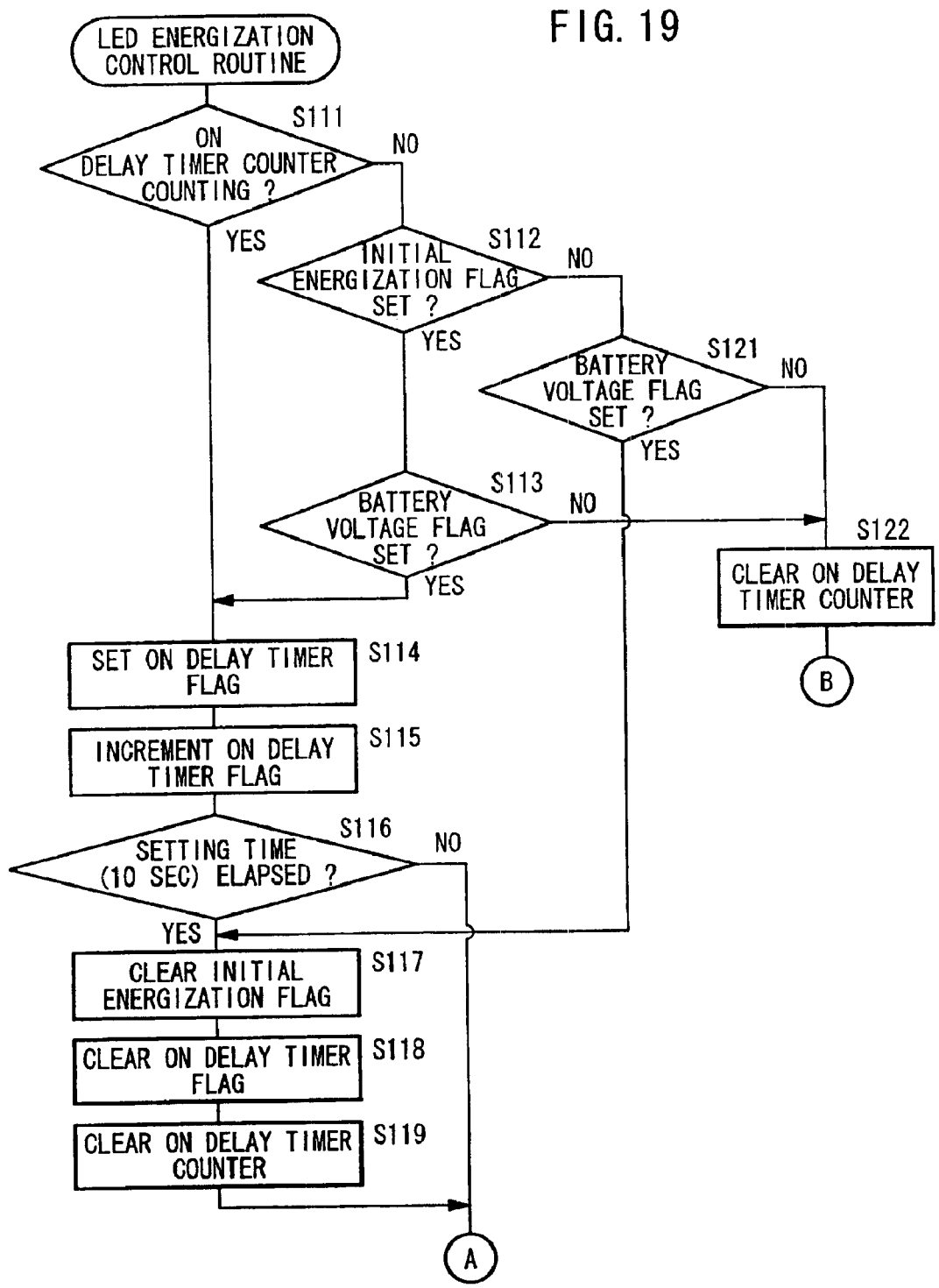
FIGS. 19 and 20 are flowcharts of an LED energization control routine in the operation sequence of the grip heater control apparatus.
Figure 20:
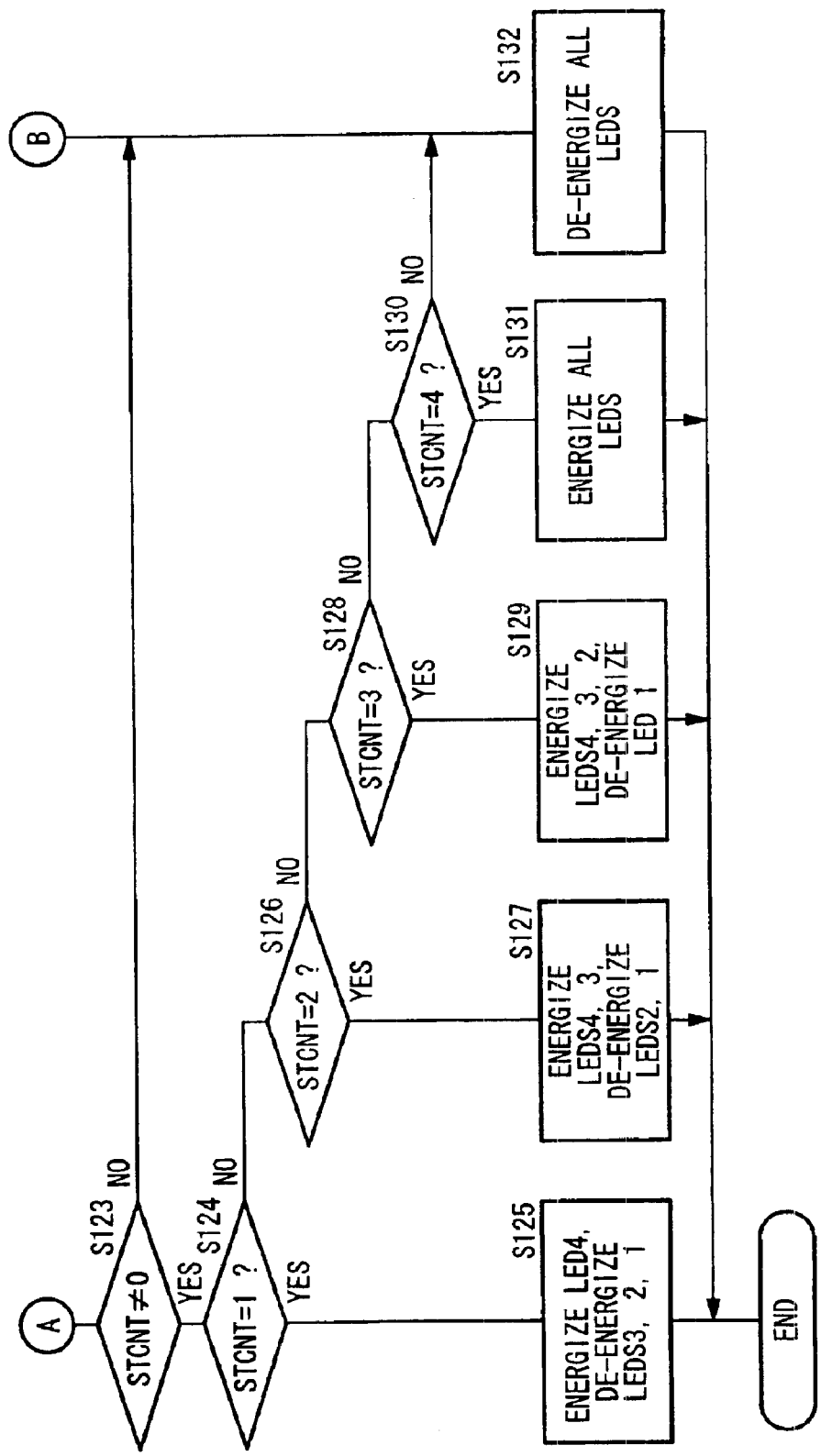

After step S10, an LED energization control routine is carried out in step S11. In the LED energization control routine, as shown in FIGS. 19 and 20, it is checked whether an ON delay timer counter is counting or not in step S111 (see FIG. 19). Immediately after the battery voltage starts to be applied, the ON delay timer counter is judged as not counting in step S111, and then it is checked whether an initial energization flag has been set or not in step S112.

Initially, the initial energization flag has been set, and it is then checked whether the battery voltage flag has been set or not in step S113. When the battery voltage is initially energized, the battery voltage flag is not set, i.e., the battery voltage has not reached the upper limit setting threshold. The ON delay timer counter is cleared in step S122, and then all the LED1–LED4 are de-energized in step S132 (see FIG. 20).

When the battery voltage rises until the battery voltage flag is set in step S113, an ON delay timer flag is set in step S114, and the ON delay timer counter is incremented in step S115. Then, it is checked whether a time set by the ON delay timer counter, e.g., 10 sec. has elapsed or not in step S116.

Until the set time (10 sec.) elapses after the battery voltage flag is set, the count value of the stage counter is checked after step S116, and a number of LEDs based on the count value of the stage counter are energized. Specifically, if the count value of the stage counter is 0 in step S123, then all the LED1–LED4 are de-energized in step S132. If the count value of the stage counter is 1 in step S124, only the LED4 is energized in step S125.

If the count value of the stage counter is 2 in step S126, only the LED3, LED4 are energized in step S127. If the count value of the stage counter is 3 in step S128, only the LED2, LED3, LED4 are energized in step S129. If the count value of the stage counter is 4 in step S130, all the LED1–LED4 are energized in step S131.

If the battery voltage flag is judged as being set in step S113, step S114 is carried out, causing the ON delay timer counter to start counting in step S115. When step S111 is carried out in a next cycle, it is followed by the execution of step S114.

If the set time (10 sec.) is judged as having elapsed in step S116, the initial energization flag is cleared in step S117, and the ON delay timer flag is cleared in step S118. Then, the ON delay timer counter is cleared in step S119, which is followed by the execution of step S123. When step S123 is carried out, a number of LEDs based on the count value of the stage counter are energized in steps S124–S132.

Since the ON delay timer flag is cleared in step S118, the ON delay timer counter is judged as not counting when it is checked in step S111 in a next cycle, and then the initial energization flag is checked in step S112. In this case, since the initial energization flag has been cleared in step S117, it is checked after step S112 whether the battery voltage flag has been set in step S121.

If the battery voltage flag has been set in step S121, step S116 is not carried out, but step S117 is carried out after step S121. If the battery voltage flag has not been set in step S121, then step 122 is carried out.

Figure 25:
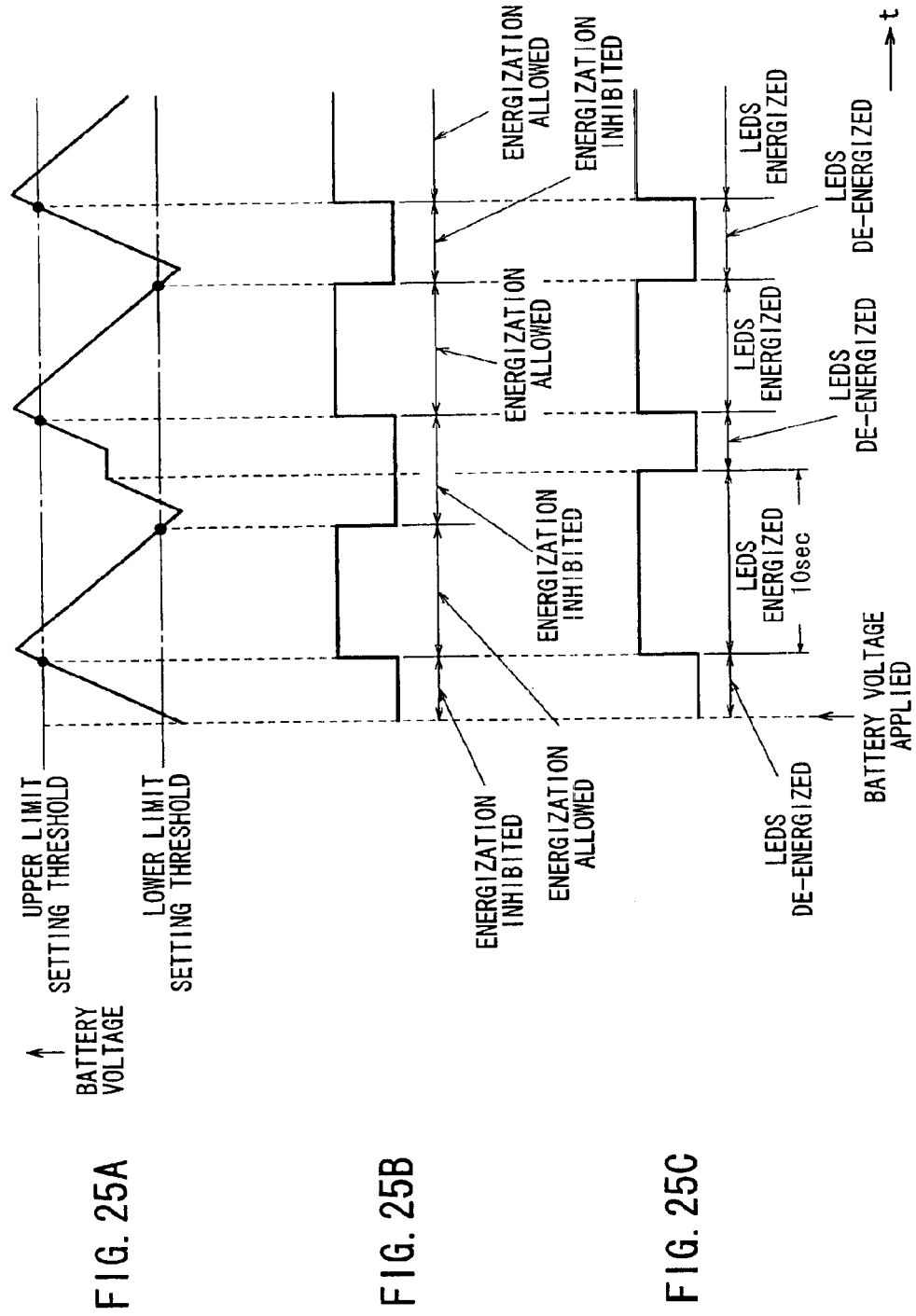
FIG. 25A is a diagram showing a battery voltage in the operation sequence of the grip heater control apparatus.
FIG. 25B is a diagram showing a heater energization control process.
FIG. 25C is a diagram showing how LEDs are energized and de-energized in association with the battery voltage and the heater energization control process.

The battery voltage flag is set and cleared as described above according to the battery voltage checking routine with respect to FIGS. 24A and 24B. According to the LED energization control routine, as shown in FIGS. 25A and 25C, by referring to the battery voltage flag as it is set and cleared, all the LED1–LED4 are de-energized from the start to apply the battery voltage until the battery voltage increases to the upper limit setting threshold. For a setting time, e.g., 10 sec., from the time when the battery voltage initially reaches the upper limit setting threshold, a number of LEDs based on the count value of the stage counter are energized. If the battery voltage drops to the lower limit setting threshold during the setting time (10 sec.), then after elapse of the setting time (10 sec.), all the LED1–LED4 are de-energized until the battery voltage reaches the upper limit setting threshold next time. When the battery voltage is restored and reaches the upper limit setting threshold, the ON delay timer counter is subsequently made irrelevant, and a number of LEDs based on the count value of the stage counter are energized until the battery voltage falls to the lower limit setting threshold.

In this manner, battery voltage values serving as thresholds for energizing and de-energizing the LEDs are made so hysteretic that a number of LEDs based on the count value of the stage counter are energized only within a battery voltage range from the upper limit setting threshold to the lower limit setting threshold. For a period set by the ON delay timer counter after the battery voltage has initially reached the upper limit setting threshold from the start to apply the battery voltage, e.g., for a period of 10 sec., the LEDs are energized. This is because the LEDs are not to be repeatedly flickered for the period set by the ON delay timer counter, e.g., for a period of 10 sec.

Figure 21:
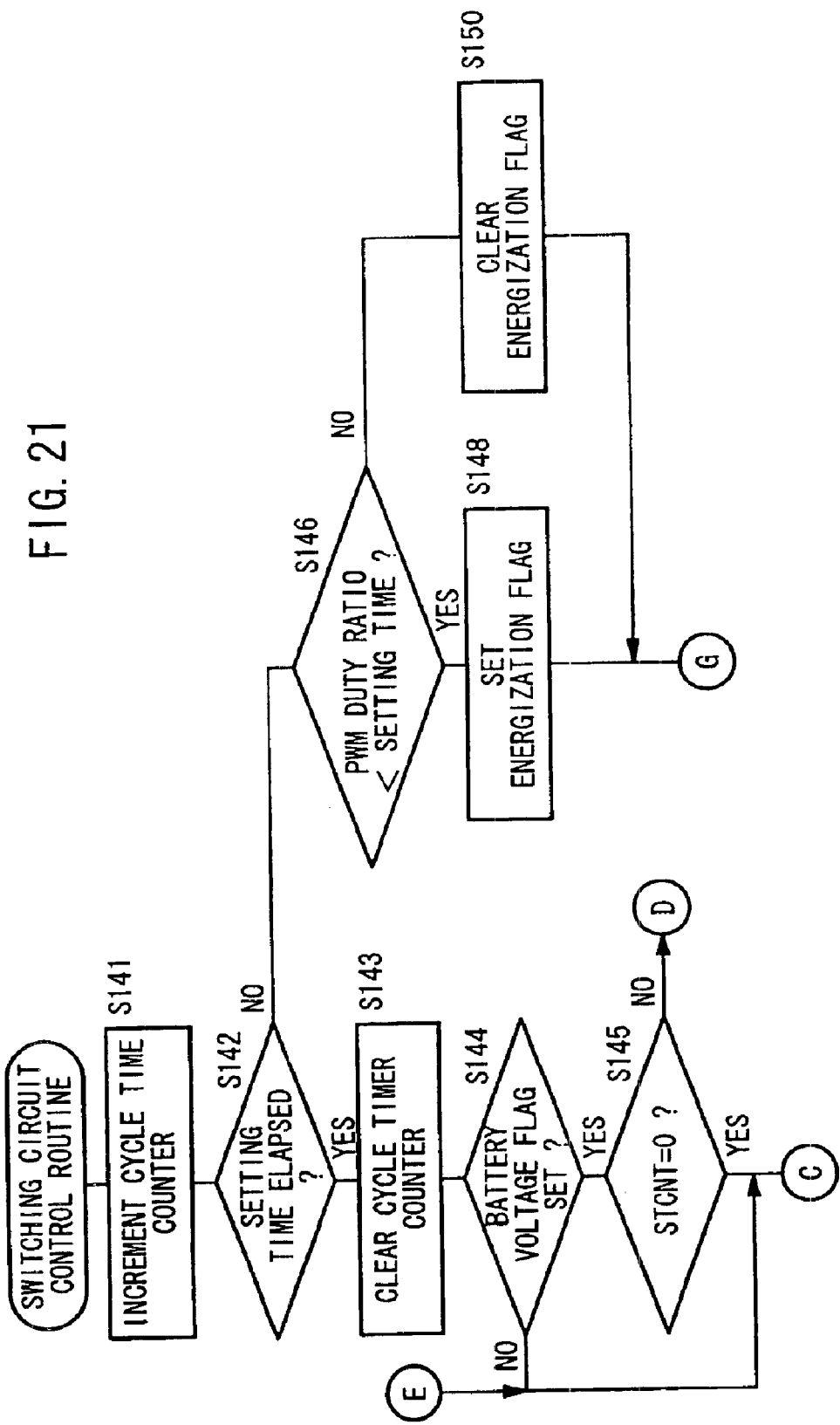
FIGS. 21 through 23 are flowcharts of a switching circuit control routine in the operation sequence of the grip heater control apparatus.
Figure 22:
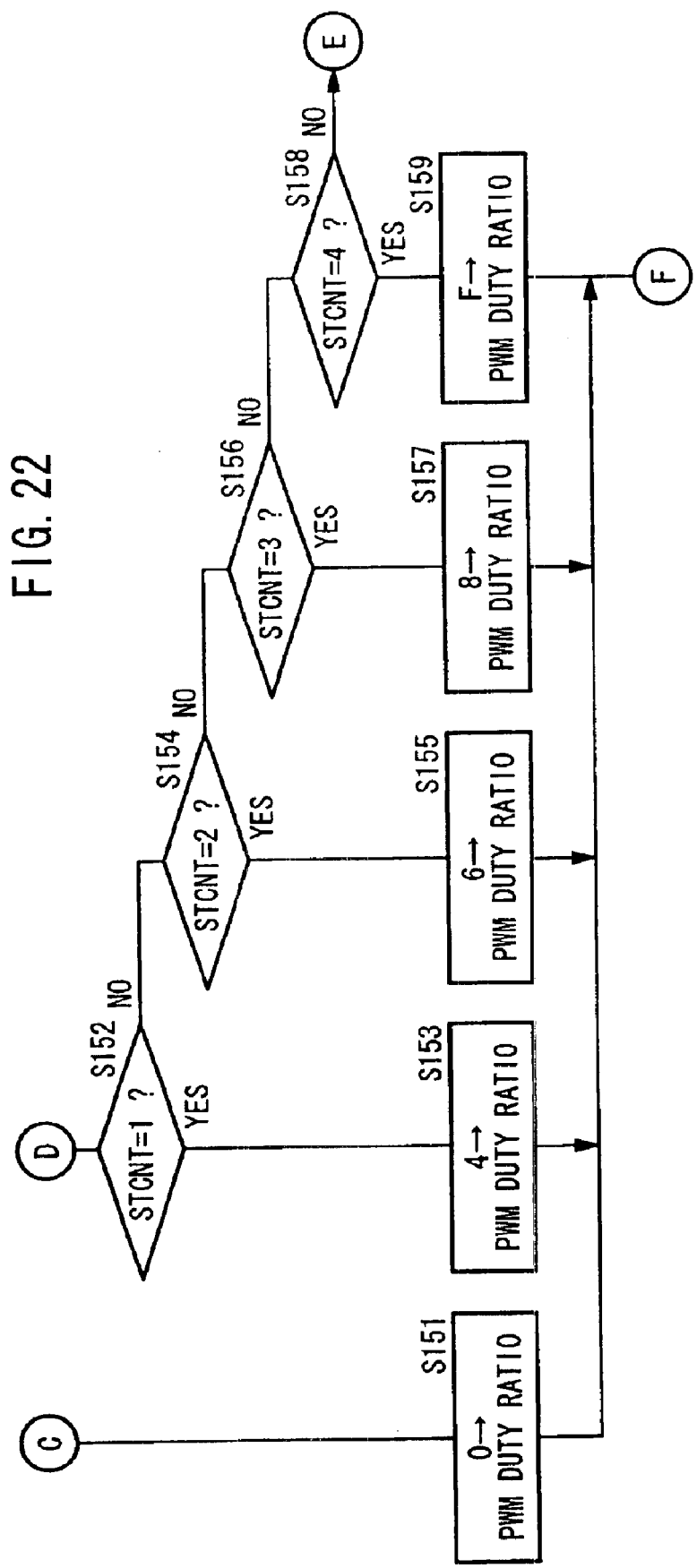
Figure 23:
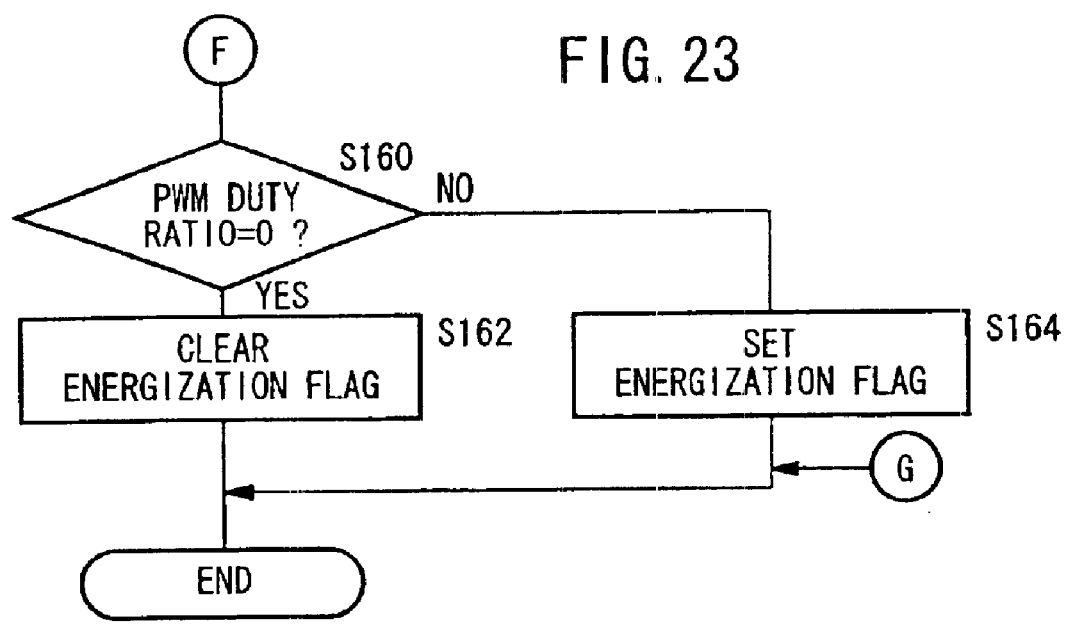

After step S11, a switching circuit control routine is carried out in step S14. In the switching circuit control routine, as shown in FIGS. 21 through 23, a cycle time counter is incremented in step S141 (see FIG. 21). A cycle time corresponds to one period of the switching circuit 314 (ON period+next OFF period), and is set to 100 ms, for example.

After step S141, it is checked whether the setting time (100 ms) has elapsed or not in step S142. If the setting time (100 ms) has elapsed, then the cycle time counter is cleared in step S143. Then, it is determined whether the battery voltage flag has been set or not in step S144. If the battery voltage flag has been set, then it is checked whether the count value of the stage counter is 0 or not in step S145.

If the count value of the stage counter is 0, then a PWM duty ratio is set to 0 in step S151 (see FIG. 22). When the PWM duty ratio is set to 0, the transistors Q1–Q3 are turned off in the set cycle time, thus turning off the heater 15 in the set cycle time, i.e., controlling the energization ratio at 0%.

If the count value of the stage counter is not 0 in step S145, then it is checked whether the count value of the stage counter is 1 or not in step S152. If the count value of the stage counter is 1, then the PWM duty ratio is set to 4 in step S153. When the PWM duty ratio is set to 4, the transistors Q1–Q3 are turned on in a period which is 40% of the set cycle time, thus turning on the heater 15 in the period which is 40% of the set cycle time, i.e., controlling the energization ratio at 40%.

If the count value of the stage counter is not 1 in step S152, then it is checked whether the count value of the stage counter is 2 or not in step S154. If the count value of the stage counter is 2, then the PWM duty ratio is set to 6 in step S155. When the PWM duty ratio is set to 5, the transistors Q1–Q3 are turned on in a period which is 60% of the set cycle time, thus turning on the heater 15 in the period which is 60% of the set cycle time, i.e., controlling the energization ratio at 60%.

If the count value of the stage counter is not 2 in step S154, then it is checked whether the count value of the stage counter is 3 or not in step S156. If the count value of the stage counter is 3, then the PWM duty ratio is set to 8 in step S157. When the PWM duty ratio is set to 8, the transistors Q1–Q3 are turned on in a period which is 80% of the set cycle time, thus turning on the heater 15 in the period which is 80% of the set cycle time, i.e., controlling the energization ratio at 80%.

If the count value of the stage counter is not 3 in step S156, then it is checked whether the count value of the stage counter is 4 or not in step S158. If the count value of the stage counter is 4, then the PWM duty ratio is set to F in step S159. When the PWM duty ratio is set to F, the transistors Q1–Q3 are turned on in the set cycle time, thus turning on the heater 15 in the set cycle time, i.e., controlling the energization ratio at 100%.

If the count value of the stage counter is not 4 in step S158, then control goes back to step S151.

If the setting time (100 ms) has not elapsed in step S142, then it is checked whether the PWM duty ratio is shorter than the setting time or not in step S146. If the PWM duty ratio is shorter than the setting time, then the energization flag is set in step S148, and the switching circuit control routine is put to an end. If the PWM duty ratio is not shorter than the setting time in step S146, then the energization flag is cleared in step S150, and the switching circuit control routine is put to an end.

After steps S151, S153, S155, S157, and S159, it is checked whether the PWM duty ratio is 0 or not in step S160. If the PWM duty ratio is 0, then the energization flag is cleared in step S162, and the switching circuit control routine is put to an end. If the PWM duty ratio is not 0, then the energization flag is set in step S164, and the switching circuit control routine is put to an end.

Based on the battery voltage flag as it is set and cleared, the battery voltage and inhibited and allowed energization periods are related as shown in FIGS. 25A and 25B. Specifically, the upper limit setting threshold is set to the sum of the lower limit setting threshold, at which the heater 15 is inhibited from being energized, and a predetermined voltage, and the heater 15 is inhibited from being energized by the switching circuit 314 in a period in which the average corrected battery voltage shown in FIG. 25A rises from below the lower limit setting threshold and reaches the upper limit setting threshold next time. The heater 15 is allowed to be energized by the switching circuit 314 in a period in which the average corrected battery voltage, which has reached the upper limit setting threshold, reaches the lower limit setting threshold next time. The allowed energization period is a period in which the heater 15 is allowed to be energized. In the period in which the heater 15 is allowed to be energized based on the battery voltage flag, the heater 15 is energized for the period of the cycle time which corresponds to the count value of the stage counter.

The switching circuit control routine is followed by an EEPROM writing routine in step S15. In the EEPROM writing routine, only when the count value of the stage counter is updated, the updated count value is written into a predetermined address in the EEPROM 20. The count value of the stage counter which is written in the EEPROM 20 is used as the initial value of the stage counter.

When the count value of the stage counter is to be written, it may be written successively an odd number of times into respective different predetermined addresses, and when the count value of the stage counter is to be read, three of the written count values of the stage counter may be read, and the same count value may be retrieved from the read count values and used as an initial value. Alternatively, one of the written count values of the stage counter may be determined by a majority rule and used as an initial value.

Figure 26:
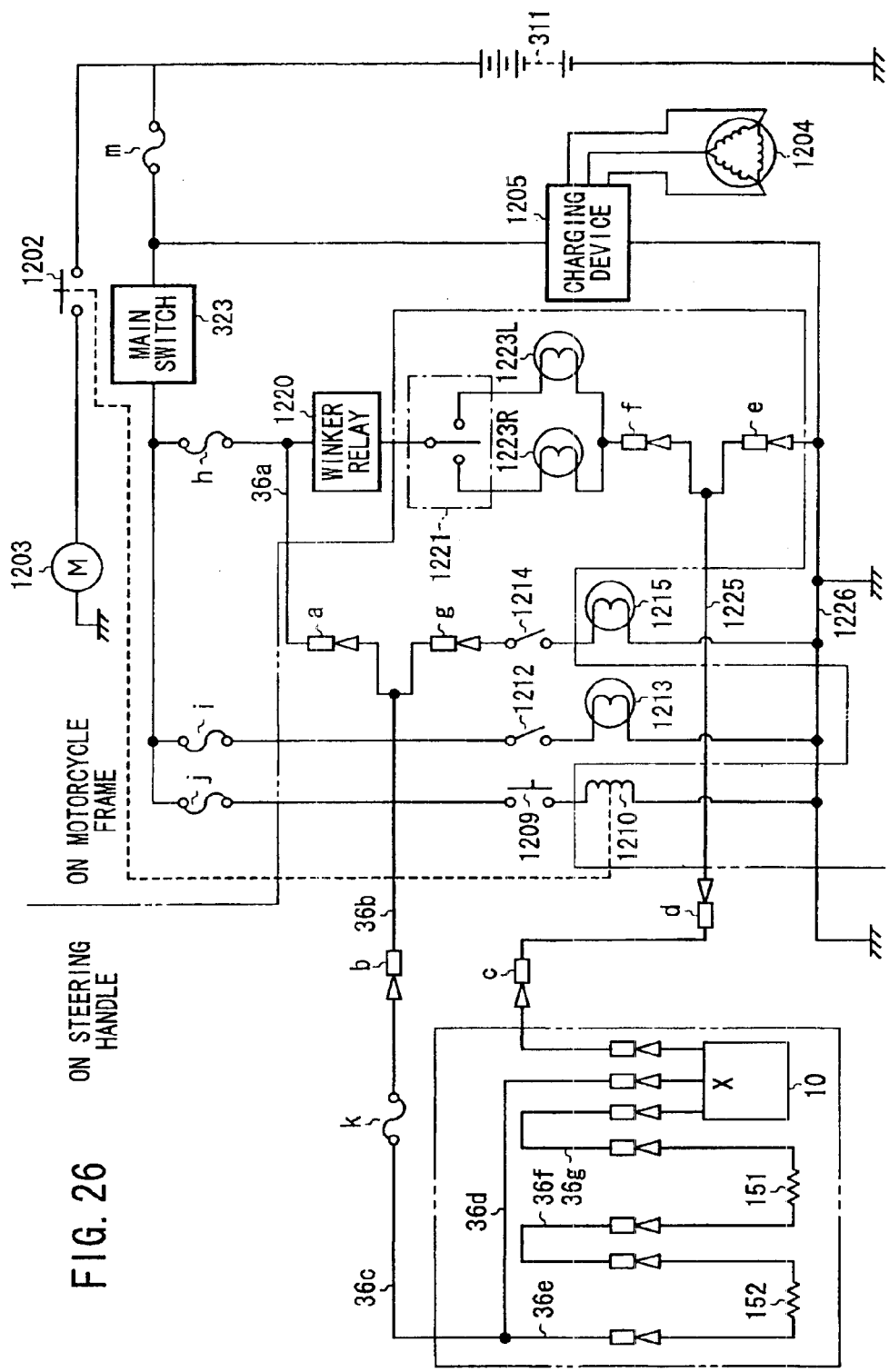
FIG. 26 is a diagram showing connections of the grip heater control apparatus in the motorcycle.

Connections of the grip heater control apparatus 10 in the motorcycle will be described in detail below with reference to FIG. 26. In FIG. 26, the reference characters a–g represent connection terminals, and the reference characters h–k, m represent fuses. These connection terminals and fuses will not be described in detail below.

Output power from the battery 311 is supplied through the main switch 323 and connection lines 36a, 36b, 36c, 36d, 36e, 36f, 36g to the heater 152, the heater 151, and the grip heater control apparatus 10. The connection lines 36a, 36b, 36c, 36d, 36e, 36f, 36g jointly serve as the wire 36. A connection line 36f connects the heaters 152, 151 in series with each other. The battery voltage is applied via the wire 36 to an input terminal x of the voltage dividing circuit 312, which divides the battery voltage. The reference numeral 1226 represents a ground line.

As shown in FIG. 26, the battery voltage is detected in the grip heater control apparatus 10 at a position spaced from the position where the battery 311 is located, and hence the detected battery voltage is subject to a voltage drop caused by the wire 36.

The output power from the battery 311 is supplied to a starter motor 1203 through a relay switch 1202 which is turned on when a starter switch 1209 is turned on. Alternating-current power produced by an alternator 1204 is supplied to a charging device 1205, which rectifies the alternating-current power and charges the battery 311 with the rectified power.

The output power supplied from the battery 311 through the main switch 323 is supplied through the starter switch 1209 to a relay coil 1210, which is energized when the starter switch 1209 is turned on, turning on the relay switch 1202 to energize the starter motor 1203.

The output power supplied from the battery 311 through the main switch 323 is also supplied through a head lamp switch 1212 to a head lamp 1213, which is energized when the head lamp switch 1212 is turned on. The output power supplied from the battery 311 through the main switch 323 is also supplied through a stop switch 1214 to a stop lamp 1215, which is energized when the stop switch 1214 is turned on.

The output power supplied from the battery 311 through the main switch 323 is further supplied through a winker relay 1220 and a winker switch 1221 to winker lamps 1223R, 1223L. One of the winker lamps 1223R, 1223L which is selected by the winker switch 1221 is intermittently turned on in repetitive periods based on the winker relay 1220.

In the LED energization control routine (step S11), as described above, the LEDs are energized for a period preset by the ON delay timer counter from the time when the battery voltage has initially reached the upper limit setting threshold after the battery voltage started to be applied, e.g., for a period of 10 sec (see step S116, etc.). This is to prevent the LEDs from flickering repeatedly in a period preset by the ON delay timer counter after the battery voltage started to be applied, e.g., for a period of 10 sec.

Specifically, irrespective of whether the battery 311 is brand-new or not, when the battery 311 starts to supply electricity, the battery voltage exceeds the upper limit setting threshold. For a short period of time from the start to supply electricity from the battery 311, the battery voltage may fluctuate across the upper limit setting threshold and the lower limit setting threshold. Therefore, unless the LEDs are instructed to be continuously energized, the LEDs tend to flicker repeatedly in that period. In the LED energization control routine, the LEDs are energized in the above period preset by the ON delay timer counter after the battery voltage started to be applied, e.g., 10 sec., so that the LEDs are prevented from flickering repeatedly.

Particularly, if the battery 311 is not brand-new, the battery voltage increases in a fluctuating pattern, as indicated by the curve b shown in FIG. 27, due to an abrupt change in the load on the battery 311 at the time of starting the motorcycle, a ripple in the rectified output produced from the output of the alternator 1204, a voltage drop across the wire 36, etc. As a result, the battery voltage changes across the upper limit setting threshold and the lower limit setting threshold a plurality of times. In FIG. 27, the straight line a represents the battery voltage when the battery 311 is brand-new.

When the above function to energize the LEDs in the period preset by the ON delay timer counter is canceled, the LEDs are caused to flicker repeatedly immediately after the motorcycle starts to operate. Consequently, if the continued energization of the LEDs in the period (10 sec.) preset by the ON delay timer counter is stopped, then when the LEDs are caused to flicker repeatedly from the time the battery voltage starts to be applied, it can be judged that the battery 311 is old.

In the above illustrated embodiment, the present invention is illustrated as being applied to the grip heaters of a motorcycle. However, the principles of the present invention are not limited to the grip heaters of a motorcycle, but are also applicable to the grip heaters of a snowmobile, a personal water craft, a three-wheeled buggy, or the like.

In the illustrated embodiment, the switches 79a, 79b of the up switch SW1 and the down switch SW2 which function as button switches comprise key switches that can produce tactile clicks when pressed. However, the switches 79a, 79b may alternatively comprise membrane switches, dome switches, or the like which are also clickable.

The present invention offers the following advantages:

The heater control unit has first and second adjustment buttons, and the temperature of the heater which is adjusted using the first and second adjustment buttons is indicated by a plurality of LEDs that are selectively energized and de-energized. Since the temperature of the heater is simply adjusted using the first and second adjustment buttons, without the need for a potentiometer, the cost of the grip heater control apparatus is reduced, and the durability thereof is increased.

The up and down switches give the operator a tactile feedback in response to an action to turn on these switches, and the number of energized LEDs allows the operator to visually recognize energization adjustment instructions produced by the up and down switches. Since the LEDs are arranged in a linear array, the operator can easily visually recognize the number of energized LEDs. The operator can also easily predict the controlled temperature of the heater because the energization ratio for the heater is commensurate with the number of energized LEDs.

For a predetermined period after the battery voltage has initially reached the upper limit setting threshold from the start to apply the battery voltage, a number of LEDs determined by the number-of-energized-LED control means are energized. After elapse of the above predetermined period, a number of LEDs determined by the number-of-energized-LED control means are energized for a period after the battery voltage has reached the upper limit setting threshold until the battery voltage next reaches the lower limit setting threshold. For a period until the battery voltage next reaches the upper limit setting threshold from below the lower limit setting threshold, all the LEDs are de-energized. Therefore, for a period in which the battery voltage is unstable immediately after the battery voltage starts to be applied, the LEDs are energized, preventing the operator from feeling uneasy due to the flickering of the LEDs.

Corrected battery voltages, each produced by adding a voltage drop caused by the wire connected between the heater and the battery to the battery voltage which is detected each time the battery voltage is detected, are averaged to determine an average corrected battery voltage. Therefore, even if the detected battery voltage suffers noise, the effect of the noise is also averaged and smoothed, thus reducing the effect of the noise on the detected battery voltage. As a consequence, there is no need to provide a margin in setting the lower limit setting threshold.

For a period until the average corrected battery voltage next reaches the upper limit setting threshold from below the lower limit setting threshold, the switching means is inhibited from energizing the heater, and hence the heater is inhibited from being energized by the switching means. Therefore, the required voltage of the battery is maintained. For a period until the average corrected battery voltage next reaches the lower limit setting threshold after having reached the upper limit setting threshold, the switching means is allowed to energize the heater, and hence the heater can be turned on and off by the switching means. The temperature of the heater can thus be increased as the heater is turned on and off by the switching means. In a period in which the average corrected battery voltage increases from below the lower limit setting threshold, since the switching means is not allowed to energize the heater, the battery voltage does not suffer a reduction which would otherwise result from the energization of the heater.

Although certain preferred embodiments of the present invention have been shown and described in detail, it should be understood that various changes and modifications may be made therein without departing from the scope of the appended claims.

What is claimed is:

1. A grip heater control apparatus comprising:
   a heater control unit for controlling the supply of electricity from a battery to a grip heater in a steering handle;
   said heater control unit comprising:
      an up switch and a down switch; and
      a plurality of LEDs,
   wherein the number of energized LEDs is increased based on the number of times said up switch is turned on, and the number of energized LEDs is decreased based on the number of times said down switch is turned on.

2. A grip heater control apparatus according to claim 1, wherein said heater control unit further comprises:
   switching means for selectively energizing said grip heater with said battery to control the supply of electricity from said battery to said grip heater;
   number-of-energized-LED control means for controlling the number of energized LEDs based on the number of times said up switch is turned on, and controlling the number of de-energized LEDs based on the number of times said down switch is turned on, thereby to control the number of energized LEDs; and
   energization control means for controlling said switching means at an energization ratio determined by said number-of-energized-LED control means.

3. A grip heater control apparatus according to claim 2, wherein said heater control unit further comprises LED energization control means, and said energization control means comprises:
   means for turning on and off said switching circuit at said energization ratio determined by said number-of-energized-LED control means for a period of time after the battery voltage of said battery has reached an upper limit setting threshold that is equal to the sum of a lower limit setting threshold, at which said grip heater is inhibited from being energized, and a predetermined voltage, until the battery voltage next reaches the lower limit setting threshold;
   said LED energization control means comprising means for energizing a number of LEDs for a predetermined period of time after the battery voltage has initially reached the upper limit setting threshold from the application of the battery voltage, and energizing a number of LEDs determined by said number-of-energized-LED control means for a period of time after the battery voltage has reached the upper limit setting threshold until the battery voltage next reaches the lower limit setting threshold, after elapse of said predetermined period of time.

4. A grip heater control apparatus according to claim 1, wherein said up switch comprises a first button switch and said down switch comprises a second button switch;
   said heater control unit further comprising:
      a controller;
      a casing housing said controller therein;

a cover connected to an upper portion of said casing and supporting on an upper surface thereof said first button switch, said second button switch, and said LEDs; and a connector mounted on a side of said casing which lies substantially perpendicularly to the upper surface of said cover, for allowing a cable connected to said controller to extend out of said casing;

said controller being surrounded by said casing and said cover.

5. A grip heater control apparatus according to claim 4, wherein said connector has:

an insertion sleeve in which said cable connected to said controller is inserted; and grooves defined in respective opposite sides thereof which extend substantially perpendicularly to an axial direction of said insertion sleeve, said grooves extending from said cover to said casing;

said side of said casing engaging in said grooves.

6. A grip heater control apparatus according to claim 4, wherein said cover has engaging teeth projecting from inner wall surfaces thereof, said engaging teeth being locked in respective engaging holes defined in said casing in alignment with said engaging teeth when said cover is mounted on the upper portion of said casing.

7. A grip heater control apparatus according to claim 4, wherein said heater control unit is inserted in an installation hole defined in a body cowling of a motorcycle, said body cowling being attached to said cover by teeth of said cover.

8. A grip heater control apparatus according to claim 4, wherein said controller is fixed in position by a thermosetting resin material filled in said casing.

9. A grip heater control apparatus comprising:

a grip heater in a steering handle;

a heater control unit for controlling the supply of electricity from a battery to the grip heater;

a switch for switching electricity with the heater control unit;

a plurality of LEDs the number of energized LEDs being changed based on the number of times the switch is turned on;

average corrected battery voltage calculating means for averaging corrected battery voltages, each produced by adding a voltage drop caused by a wire connected between said grip heater and said battery to the battery voltage which is detected each time the battery voltage is detected, to determine an average corrected battery voltage; and energization/de-energization control means for controlling said switching circuit to inhibit said grip heater from being energized for a period of time until the average corrected battery voltage next reaches an upper limit setting threshold that is equal to the sum of a lower limit setting threshold, at which said grip heater is inhibited from being energized, and a predetermined voltage, from below the lower limit setting threshold, and controlling said switching circuit to allow said grip heater to be energized for a period of time after the average corrected battery voltage has reached the upper limit setting threshold until the average corrected battery voltage next reaches the lower limit setting threshold.

10. A grip heater control apparatus comprising:

switching means for selectively energizing a grip heater in a steering handle with a battery;

average corrected battery voltage calculating means for averaging corrected battery voltages, each produced by adding a voltage drop caused by a wire connected between said grip heater and said battery to the battery voltage which is detected each time the battery voltage is detected, to determine an average corrected battery voltage; and energization/de-energization control means for controlling said switching circuit to inhibit said grip heater from being energized for a period of time until the average corrected battery voltage next reaches an upper limit setting threshold that is equal to the sum of a lower limit setting threshold, at which said grip heater is inhibited from being energized, and a predetermined voltage, from below the lower limit setting threshold, and controlling said switching circuit to allow said grip heater to be energized for a period of time after the average corrected battery voltage has reached the upper limit setting threshold until the average corrected battery voltage next reaches the lower limit setting threshold.

11. A grip heater control apparatus comprising:

a grip heater in a steering handle;

a heater control unit for controlling the supply of electricity from a battery to the grip heater;

a switch for switching electricity with the heater control unit;

a plurality of LEDs, the number of energized LEDs being changed based on the number of times the switch is turned on;

wherein said switch comprises a button switch;

said heater control unit further comprising:

a controller;

a casing housing said controller therein;

a cover connected to an upper portion of said casing and supporting on an upper surface thereof said button switch, and said LEDs; and a connector mounted on a side of said casing which lies substantially perpendicularly to the upper surface of said cover, for allowing a cable connected to said controller to extend out of said casing;

said controller being surrounded by said casing and said cover.

12. A grip heater control apparatus according to claim 11, wherein said connector has:

an insertion sleeve in which said cable connected to said controller is inserted; and grooves defined in respective opposite sides thereof which extend substantially perpendicularly to an axial direction of said insertion sleeve, said grooves extending from said cover to said casing;

said side of said casing engaging in said grooves.

13. A grip heater control apparatus according to claim 11, wherein said cover has engaging teeth projecting from inner wall surfaces thereof, said engaging teeth being locked in respective engaining holes defined in said casing in alignment with said engaging teeth when said cover is mounted on the upper portion of said casing.

14. A grip heater control apparatus according to claim 11, wherein said heater control unit is inserted in an installation hole defined in a body cowling of a motorcycle, said body cowling being attached to said cover by teeth of said cover.

15. A grip heater control apparatus according to claim 11, wherein said controller is fixed in position by a thermosetting resin material filled in said casing.

* * * * *